United States Patent [19]

Uczekaj et al.

[11] Patent Number: 5,920,718
[45] Date of Patent: Jul. 6, 1999

[54] METHOD AND APPARATUS FOR CREATING EXECUTABLE CODE FOR OBJECT-ORIENTED OBJECTS HAVING FINITE STATE MACHINE

[75] Inventors: Stephen A. Uczekaj, Bellevue; Michael J. Wilke, Snohomish, both of Wash.

[73] Assignee: The Boeing Company, Seattle, Wash.

[21] Appl. No.: 08/821,937

[22] Filed: Mar. 21, 1997

[51] Int. Cl.[6] .................................................. G06F 9/44
[52] U.S. Cl. ........................ 395/702; 395/701; 701/101
[58] Field of Search .................................. 395/701, 702, 395/703; 707/101

[56] References Cited

U.S. PATENT DOCUMENTS 5,542,070  7/1996  LeBlanc et al. ........................ 395/500
5,724,406  3/1998  Juster ........................................ 379/67

OTHER PUBLICATIONS

Chung–Shyan Liu "An object–based approach to protocol software implementation" ACM, pp. 307–316, 1994.
Liu et al. "An FSM–based program generator for communication protocol software" IEEE, pp. 181–186, 1884.

Primary Examiner—Tariq R. Hafiz
Assistant Examiner—Tuan Q. Dam
Attorney, Agent, or Firm—Christensen O'Connor Johnson & Kindness

[57] ABSTRACT

A graphical control system for automatically generating application program shell code in an object-oriented system. The graphical control system allows a user to easily enter object information and associated control information in a single graphical user interface. The system automatically generates application shell code according to the operating system environment in which the system is running and the user entered object and object control information. The invention eliminates the need to program in or edit control application code by hand for each object defined in the application. Also, the control code for each object is directly associated with the object during construction and therefore is created in the same desired location as that of the object data.

27 Claims, 31 Drawing Sheets

METHOD AND APPARATUS FOR CREATING EXECUTABLE CODE FOR OBJECT-ORIENTED OBJECTS HAVING FINITE STATE MACHINE

FIELD OF THE INVENTION

This invention relates to methods and apparatus for creating executable code for objects and, more particularly, methods and apparatus for creating executable code for objects having user defined characteristics.

BACKGROUND OF THE INVENTION

An object, in the framework of object-oriented computer programming, is an instance of a class that includes pieces of code called data and methods. Typically, the methods operate on private data, also called instance data, that the object owns. Objects provide a programming paradigm for creating intelligent software that mirrors physical things. Objects exhibit three properties that make them incredibly useful: encapsulation, inheritance, and polymorphism. Encapsulation means the object's implementation is hidden from public view. Inheritance is the passing of class resources or attributes from a parent class downstream in a class hierarchy to a child class. Polymorphism means identical methods located in different objects can act differently.

As shown in block diagram form in FIG. 1, traditional classes 100 include data and methods. However, control information 102, which is part of the code embodied in a computer program application, is not directly associated with the class, as illustrated by the control information's disassociation from the class 100.

FIG. 3 illustrates one form of control information 102 (FIG. 1). The three ovals 110 represent the different data states an object of a particular class experiences during execution of application program code. "State" is the cumulative results of the behavior of an object, wherein at any given point in time, the state of an object encompasses all of the (usually static) properties of the object plus the current (usually dynamic) values of each of these properties. A minimum of one data state is required for describing control information. The arrowed lines 112 connecting the data state ovals 110 indicate state transitions which include a transition method(s) executed when a specified data condition(s) is met. A state may have a single state transition or multiple unique transitions to other states. Essentially, the state diagram, FIG. 3, is an abstract representation of object operation as determined by the underlying application program code.

Despite object usefulness, in the past, abstract notions such as state-based control have not been directly related to objects (FIG. 1). In the past, state-based control has been created at the application program code level by a highly skilled programmer.

Software is available for allowing a user to easily define data without requiring the user to know the particulars of the programming code, such as C++, of the objects. The proper code is generated according to user entered object information. However, the objects created must still rely on the state-based control programmed in the application program code. In the past, there existed no easy way to create new objects or edit old objects that execute state-based control different than that programmed in the application program code. Therefore, in order to change or create state-based control, reprogramming, or adding to, the original application program code was required.

Likewise, distributed objects, e.g., objects defined by data and methods used in client/server environments, have state-based control embedded within the application program code. An object-oriented messaging system, such as Object Management Group's Common Object Request Broker Architecture (CORBA) or Microsoft's Component Object Model (COM), provides management of distributed objects on heterogeneous client/server networks. Essentially, distributed objects are either on a client or a server's side of the network. Application programmers build a main routine/application program code for controlling execution flow and for coding client distributed objects to request service from static server distributed objects. The messaging system detects clients' object requests and passes these requests to a server object that, in turn, performs the service and responds to the client with a result. Unfortunately, the client/server approach described above fails to give objects any abstract notion of behavior or control, forcing the programmer to develop the complex finite state-based control code required to manage the use of any object used in the client/server network. For example, there is currently no way a standard C++ object can be defined to launch a remote event handler routine when its data elements match a certain state without the programmer explicitly coding in the state and transition data conditions in the main application program code for monitoring the object's data for a match condition. In other words, manipulation of finite state-based control is hidden from a creator of personalized objects unless the creator is gifted with the programming knowledge to manipulate state-based control in the application program code. Creation of distributed objects and related control is still essentially a programmer's job. A non-programming type client/server manager must understand programming code in order to change the finite state-based control behavior of an object. A simple to use interface for personalizing or changing objects with object specific finite state-based control behavior does not exist.

The present invention is directed to overcoming the foregoing and other disadvantages. More specifically, the present invention is directed to providing a method and apparatus for easily generating executable code for objects with finite state-based control behaviors.

SUMMARY OF THE INVENTION

In accordance with this invention, a method and apparatus for automatically generating application program shell code for a predefined object-oriented application that is executable by an operating system is provided. A predefined application can be any one of a number of different software applications capable of being implemented by an object-oriented program.

The apparatus is a machine which includes a processor with an object-oriented operating system running thereon, at least one user interface device, memory and a display device.

The method is a specification process resulting in each object having a unique set of data, methods and finite state-based control. First, an object name that represents a physical object or other type of object used in the predefined application is assigned. Then, at least one data name and method names are assigned to the named object according to predetermined requirements. The assigned data and method names represent data and methods associated with the object represented by the object name. Next, control information is assigned to the named object. The control information is assigned according to the control functionality associated with the object in the predefined application represented by the assigned object name. Finally, application shell code executable by an operating system is generated for the named object based on the assigned data and method names and the control information.

In accordance with other aspects of this invention, the assigned control information is further defined by assigning at least one state name and assigning an object state transition, if more than one state is assigned. The object state transition is assigned at least one data condition and action. Assignment of an action includes assigning a transition method name with at least one of a call function, or spawn function to the assigned transition method name, or assigning a nullification function according to the predefined application. Each assigned state name represents a distinct state of the object in the predefined application. The object in the predefined application is represented by the assigned object name and each assigned condition of the data and transition method name. The data and transition method name represents a transition of the object, represented by the object name, between states as defined by the predefined application.

In accordance with further aspects of this invention, the generated application shell code is compatible with other objects that communicate via an object-oriented messaging network.

In accordance with yet other aspects of this invention, a predefined application is mapped to a network of machines. Each machine is assigned a machine name. A server name is then assigned to the assigned machine name, which represents a server that is to be associated with the assigned machine. Object names in the predefined application are then assigned to the server name. The automatically generated application shell code is then associated with the object assigned to the server and server assigned to the machine.

As can be readily appreciated from the foregoing summary, the invention provides a graphical control system for automatically generating application program shell code for an object-oriented system according to a predefined application. The graphical control system allows object information and associated control information to be easily entered via a single graphical user interface. Upon completion of object-oriented information entry, the system generates application shell code according to the operating system environment in which the system is running and the entered object and object control information. The invention eliminates the need to program in or edit control application code by hand for each object defined in an application.

Also, the control code for each object is directly associated with the object during construction and therefore is created in the same desired location as the object data.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
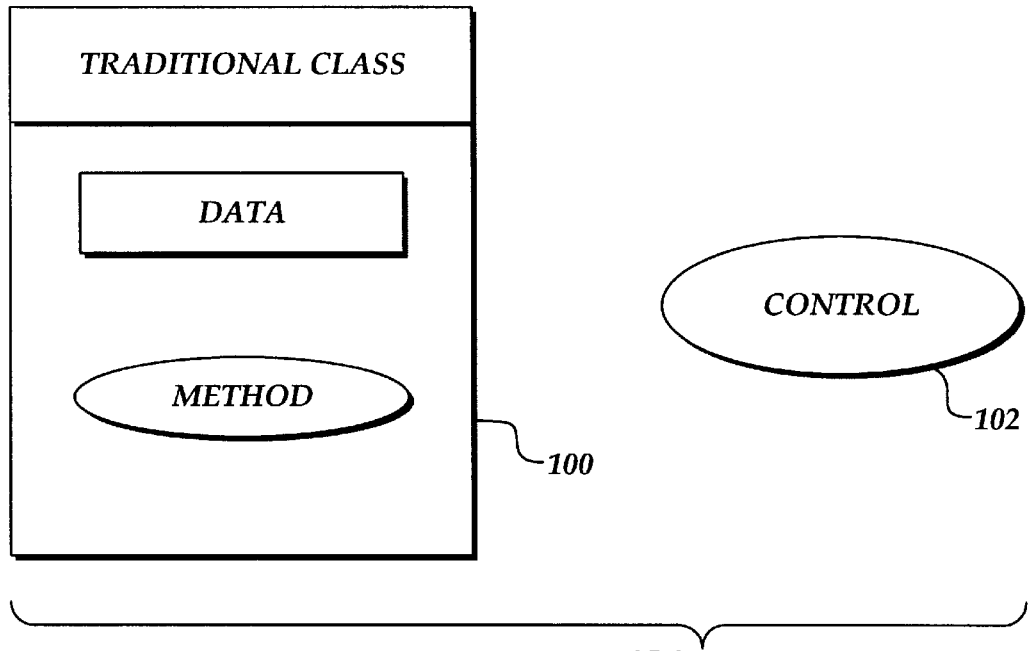
FIG. 1 is a block diagram of the associated object components of the prior known art.
Figure 2:
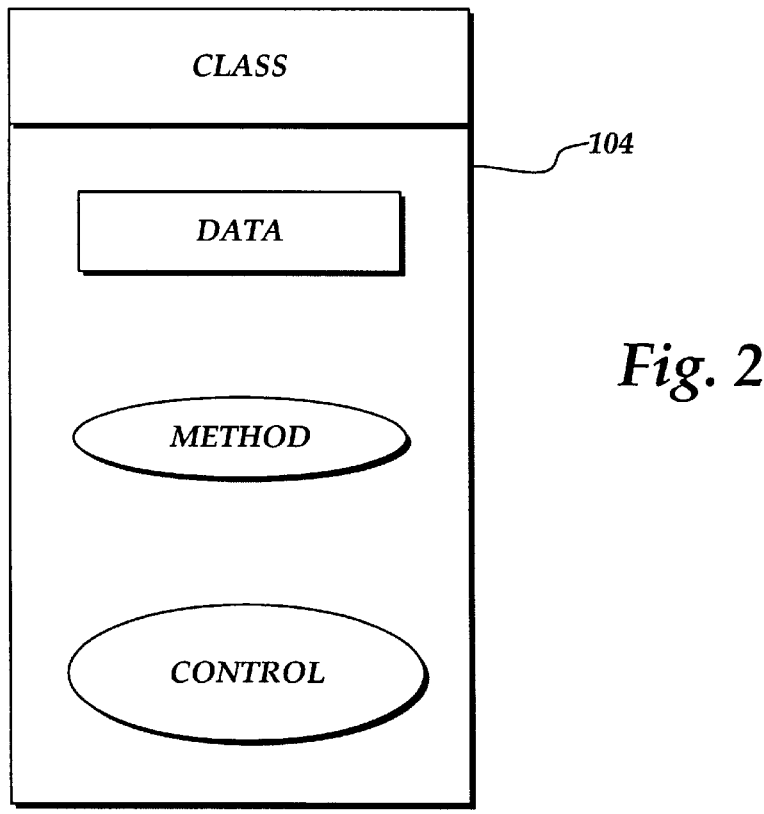
FIG. 2 is a block diagram of the associated object components according to the present invention.
Figure 3:
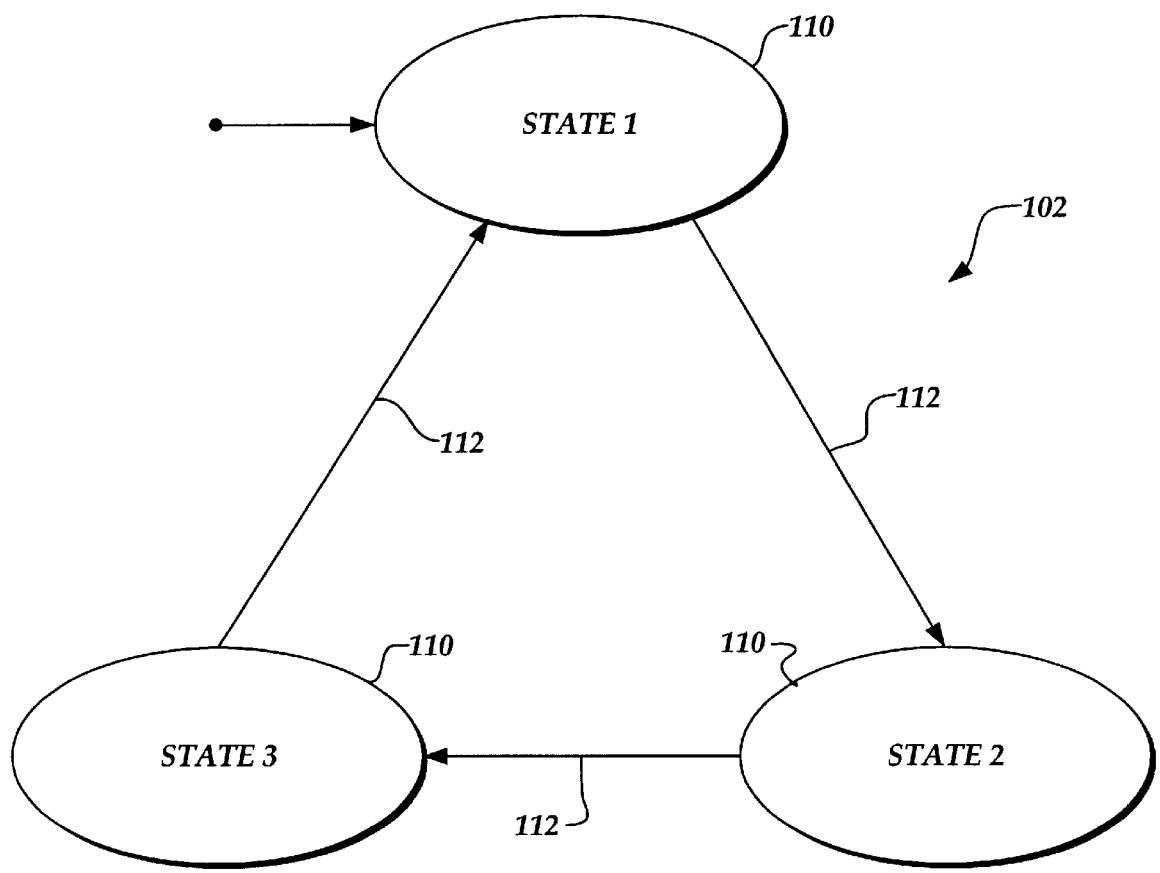
FIG. 3 is an example state diagram further illustrating the control component of FIGS. 1 and 2.

As will be better understood from the following description, the present invention provides a graphical interface tool that allows a user to extend the definition of a standard object of the type used in a typical object oriented program to include explicit finite state machine behavior. See FIG. 2. Including a finite state behavior with object definition allows a user to easily designate the specific information of an application program that operates upon object(s) defined by the user. The graphical interface tool, which is user friendly, allows a user to enter objects with state information and, based on the entered information, generates application shell code. While the example shown in FIGS. 14–33 and described below explains the invention in connection with creating objects and object control for a drill system, it is to be understood that the invention can be used to describe objects in various other environments.

Figure 4:
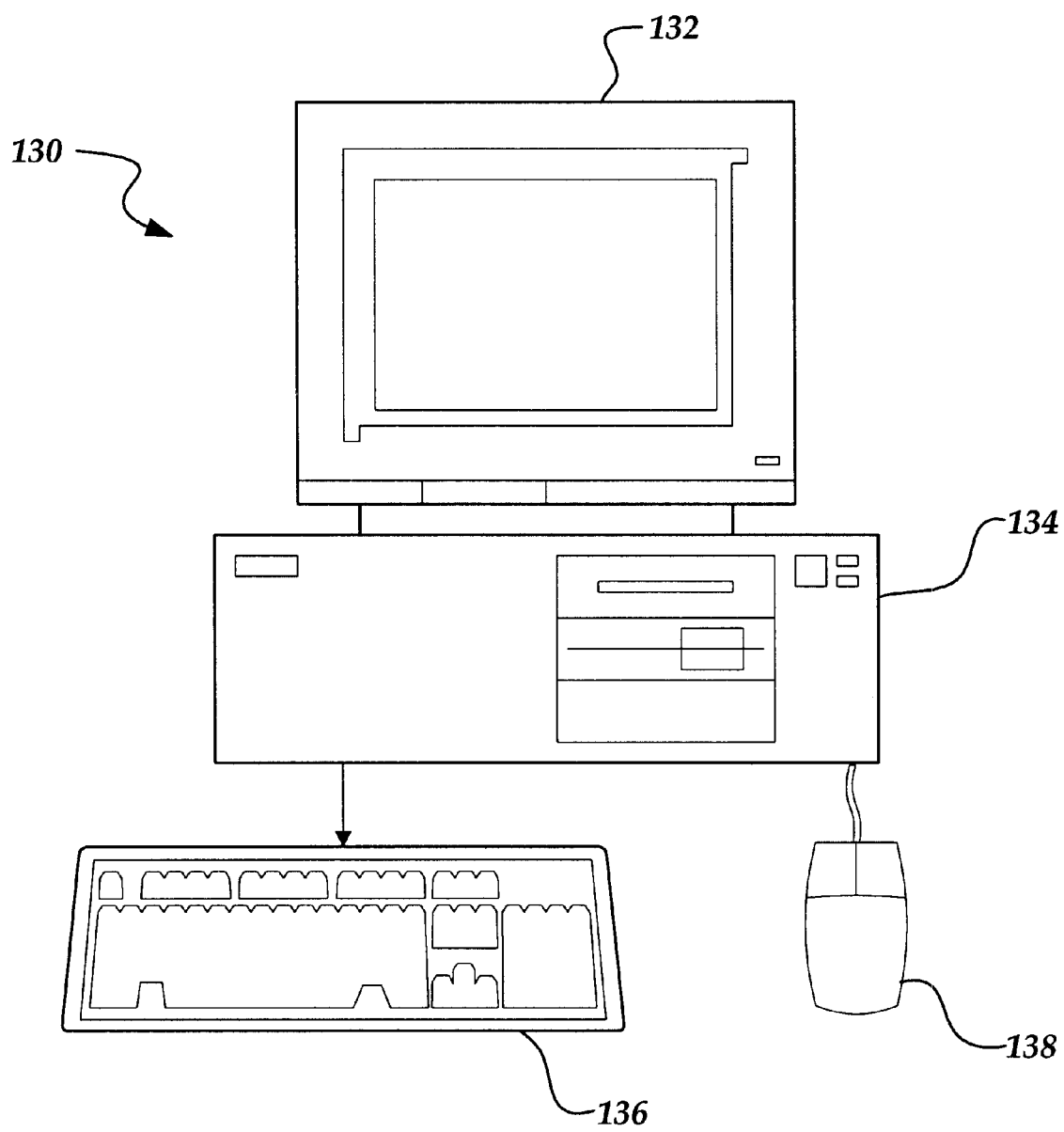
FIG. 4 is a schematic diagram illustrating a computer system suitable for implementing the present invention.

As shown in FIG. 4, the invention employs at the very least a personal computer 130 including a display 132; a central processing unit (CPU) 134 that includes a processor, memory (RAM, ROM, hard drive etc.), interfaces, etc.; and at least one user input device (e.g., keyboard 136, mouse 138, etc.). It will be apparent to those of ordinary skill in the art that personal computer 130 may include many more components, than those shown in FIG. 4. Such other components are not described because they are conventional, and an understanding of them is not necessary to an understanding of the present invention.

Figure 5:
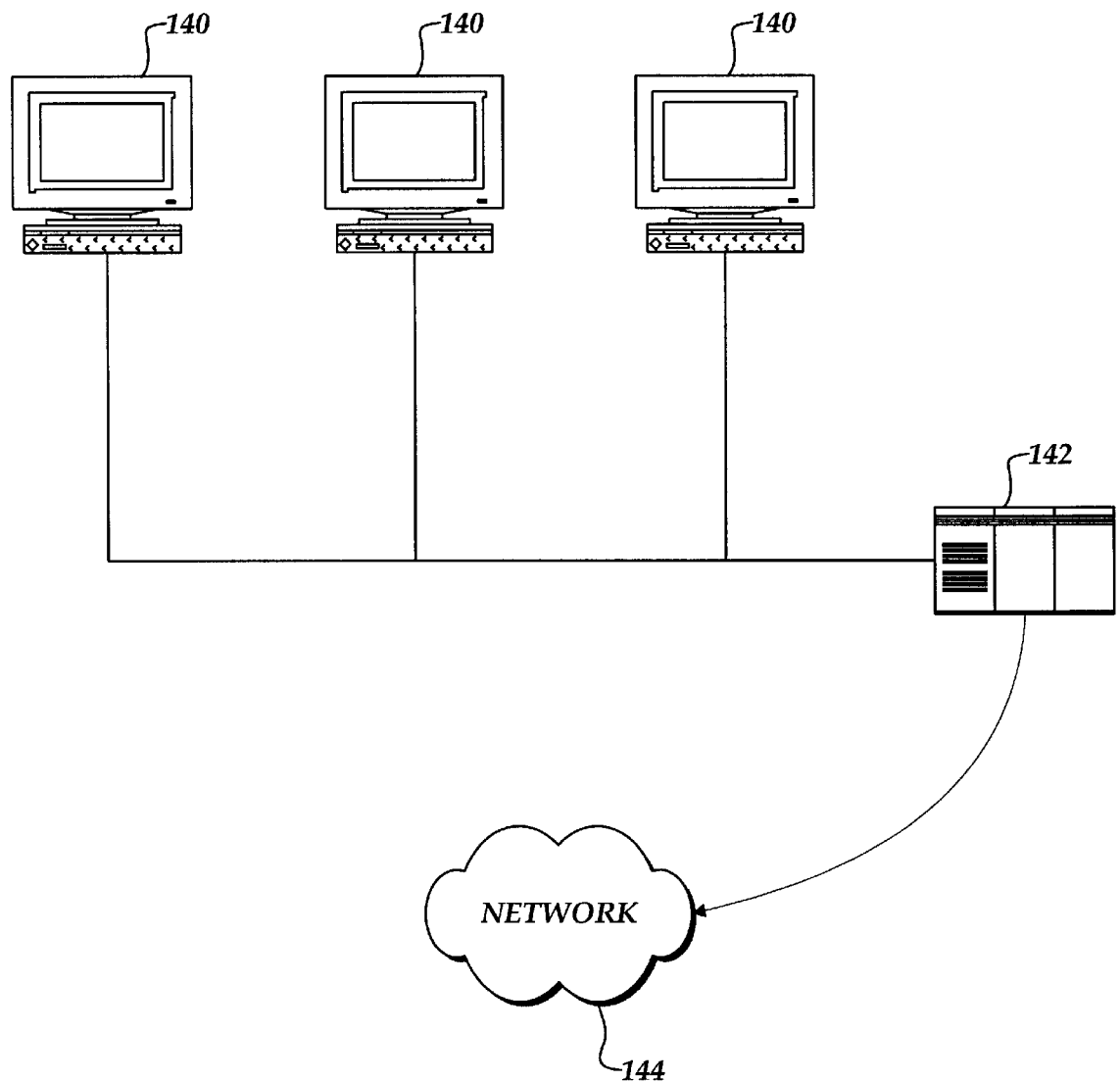
FIG. 5 is a schematic diagram illustrating a computer network suitable for connecting together computer systems of the type illustrated in FIG. 4.

In addition to being operable on a single personal computer 130 (FIG. 4), the invention is also operable in a network environment. An example of a suitable network is shown in FIG. 5, which depicts a plurality of workstation 140 connected directly or through a host server 142 to a client/server-type network 144. The client/server network 144 includes an object-oriented messaging system, such as Object Management Group's Common Object Request Broker (CORBA) or Microsoft's Component Object Model (COM), for controlling distributed object communication between clients and servers. While the current embodiment supports a standard ethernet bus, other types of networks, including non-wired networks, can be employed in actual embodiments of the invention.

In order to better understand the preferred embodiment of the invention described below, certain aspects of object-oriented programming relevant to the following discussion are first discussed. The fundamental aspects of object-oriented programming is that objects can be organized into classes in a hierarchical fashion and that objects are interpretable. Classes are abstract generic descriptions of objects and their behaviors. A class defines a certain category or grouping of methods and data within an object. Methods comprise procedures or code that operate upon data. Refinement of the methods of a class is achieved by the creation of "sub-classes." A class can be thought of as a genus, and its subclass as the species. Subclasses allow the introduction of a new class into the class hierarchy, subclasses inherit the behaviors of the higher class, from which they depend, plus new behaviors original with the subclass.

An instance of a class is a specified individual entity, something concrete having observable behavior. An instance is a specific object with the behaviors defined by its class. Instances are created and deleted dynamically. The class, however, is the broad, yet abstract, concept under which the instance belongs. The instance inherits all the methods of its class, but has particular individual values associated with it that are unique. There is only one location in memory of a computer for the class. There may, however, be numerous instances of the class, each of which has different values and different physical locations in memory. The terms class and object are used interchangeably throughout this description.

Figure 9:
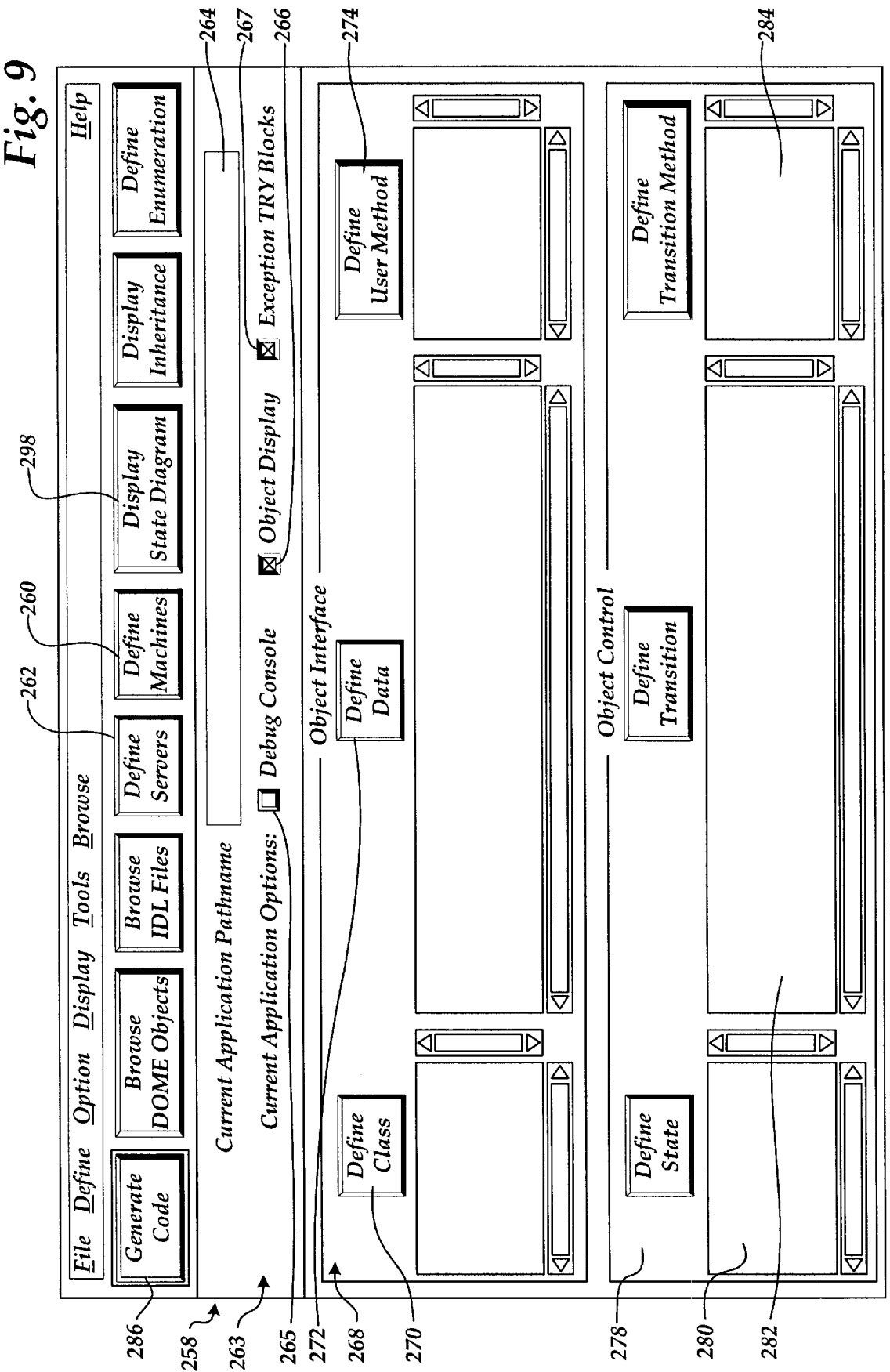
FIGS. 9–13 are display screen shots of a graphical interface tool for inputting data suitable for use in automatically generating shell code according to the present invention.

The invention allows an application programmer to declare class definitions and state-based control for the declared class. Class definitions include data and methods accessible from outside a class. The state-based control includes user defined class states and data conditions with transition methods. The transition methods are inaccessible from outside the class, because transition methods are private methods unlike user methods which are public methods. Transition methods are associated with the functioning of the underlying application control. In other words, transition method execution of a class directly relates to the environment or application program that the user defined class is functioning in. An example of an environment or application is a drilling cell of a computer networked controlled assembly line, which is illustrated in FIG. 9 and described below.

Figure 6:
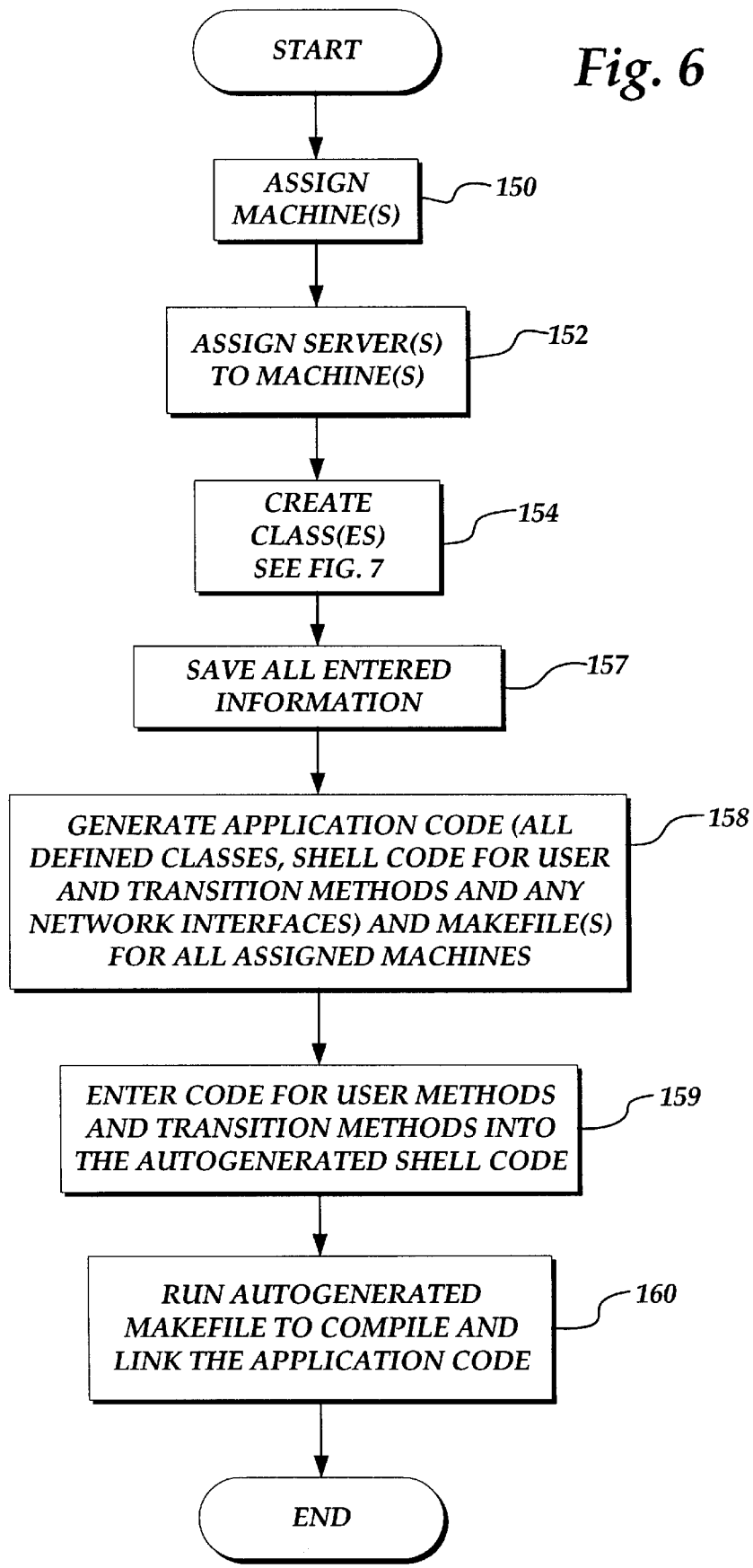
FIGS. 6–8 are flow diagrams of a method of automatically generating shell code according to the present invention.
Figure 7:
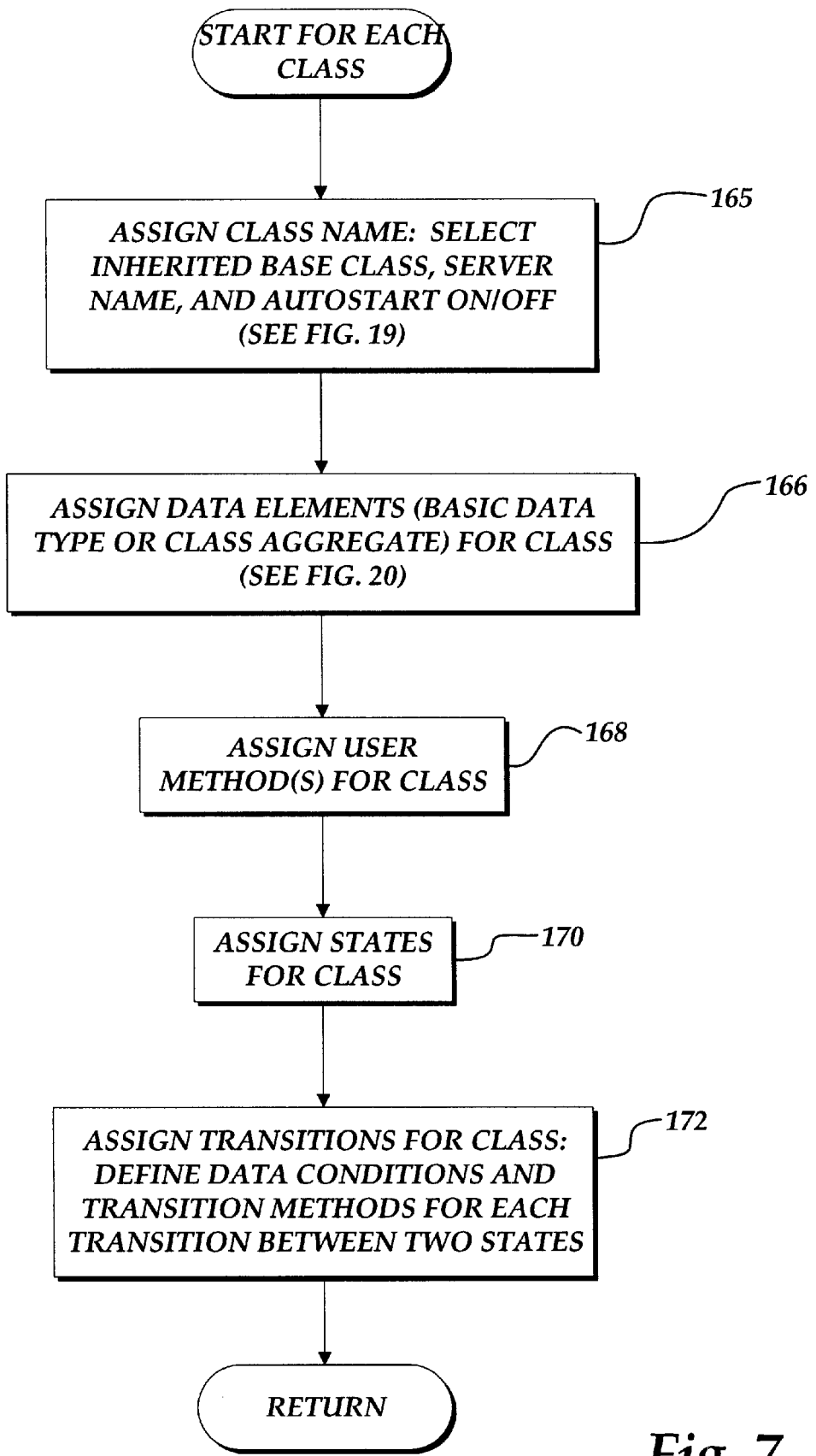
Figure 12:
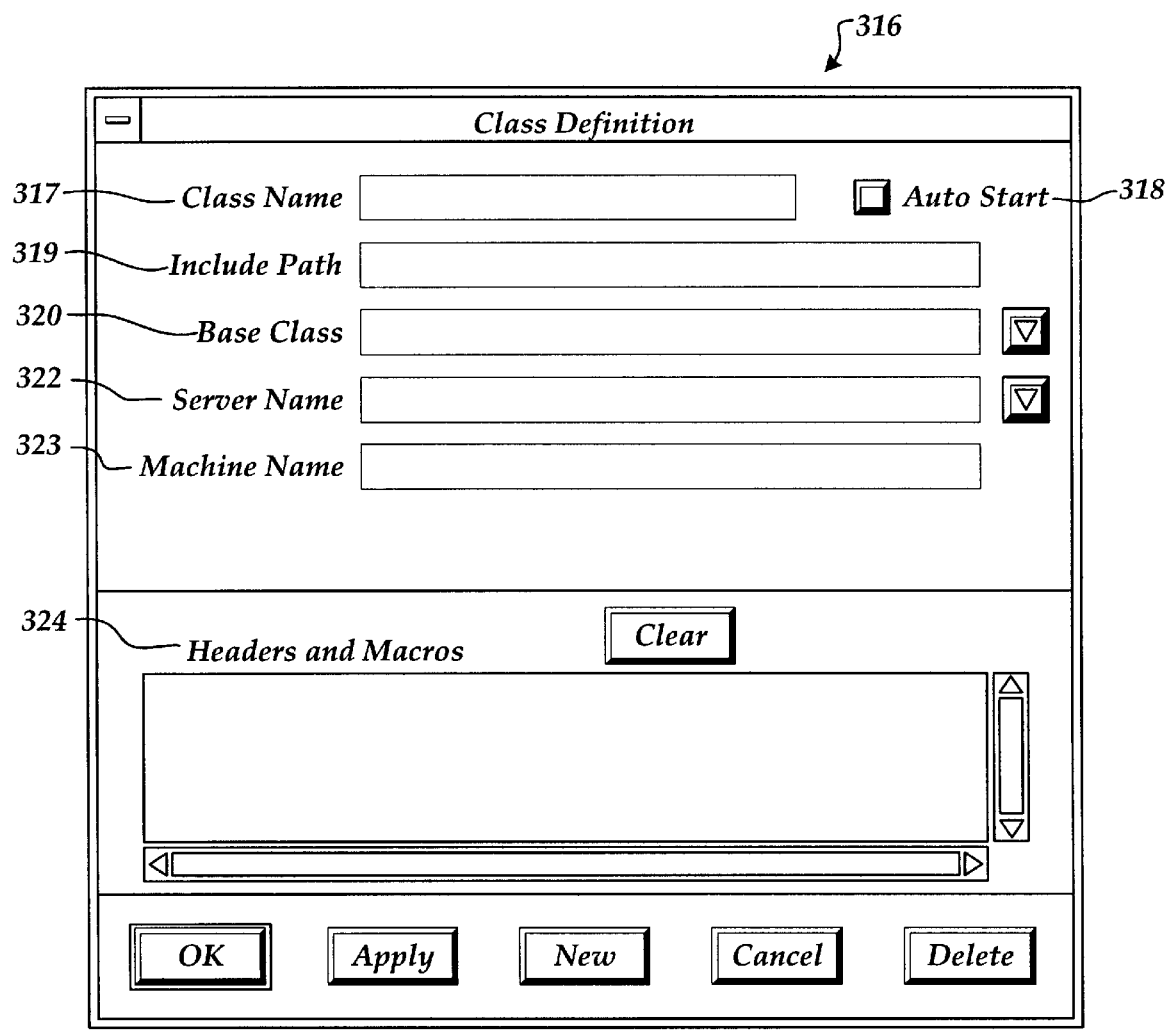

FIGS. 6 and 7 illustrate the method of creating objects with state-based control according to this invention. First, at block 150, the user assigns the machines which will run the application. In the assign machine step the user enters the network node name of a machine and the IP address of the user's machine. In one embodiment of the present invention, machines employ an operating system, such as UNIX or Solaris. IP addresses identify the machine's location within the operating system and network. A more detailed, exemplary, illustration of machine assignment is shown in FIG. 12 and described below. Next, at block 152, the user assigns one or more servers to a machine previously assigned. The assigned server is a server designated to the assigned machine. The assigned server handles communication, object or application functions, with other servers on the same machine or servers associated with other machines connected together over a network. A server will have one or more class objects assigned to it as described below. Multiple servers allow an application program to use parallel processing. A single server can only process a single application thread of an application program at a time. However, multiple servers with objects spread throughout a network allow parallel thread processing of an application program. The user can change the distributed topology of an application by changing server assignment. See FIGS. 13 and 14 and the related description set forth below.

The user is now ready to create a class. At block 154, the user creates a class simply by designating a name for the class. Also at block 154 the user defines data, methods (user methods) and states. The states include state names and transitions between states. The transitions include data conditions and transition methods or actions. The actions that occur at block 154 are illustrated in more detail in FIG. 7 and described below. At block 157, the user stores the entered information for later retrieval and editing, described below with respect to FIG. 8. At block 158, the user prompts the system to generate application source code for: all of the defined classes; all of the assigned servers and machines; all of the data associated with the created classes; and any operating system or network interfaces and to generate MakeFile(s) for all assigned machines. Code generation is automatically performed by a predefined algorithm that retrieves the assigned and defined information and translates the retrieved information into the required code and interfaces. The algorithm is essentially a compiler technique that parses the information entered into the graphical interface tool and translates the parsed items into application shell code. Preferably, the recursive descent compiler technique is used. In order for successful algorithm operation, a grammar or a set of rules is created by the compiler writer for describing the information entered into the graphical interface tool prior to parsing. The compiler writer also creates a translation scheme for translating the parsed items into application shell code. The generation step may be initiated after the user has completed information entry for a single class or multiple classes. The generated code includes method shell code files in which the user must enter a code that defines user or transition methods in order for the application program code to be complete, see block 159. Compiling and linking the application source code is performed by running the autogenerated MakeFile(s) as shown in block 160. The step of running the MakeFile(s) is preferably performed after exiting the user interface tool.

As shown in FIG. 7, class name is assigned, shown in block 165. Included with assigned class name are a selection of inherited base class(es), server name and autostart of class option. Next is the assignment of publicly available data at block 166 which includes basic data type or class aggregate for the assigned class. Methods for the assigned class are then assigned at block 168. At block 170, state names for the assigned class are entered and at block 172 data conditions and related transition methods that define transitions between the entered state names are entered.

Figure 8:
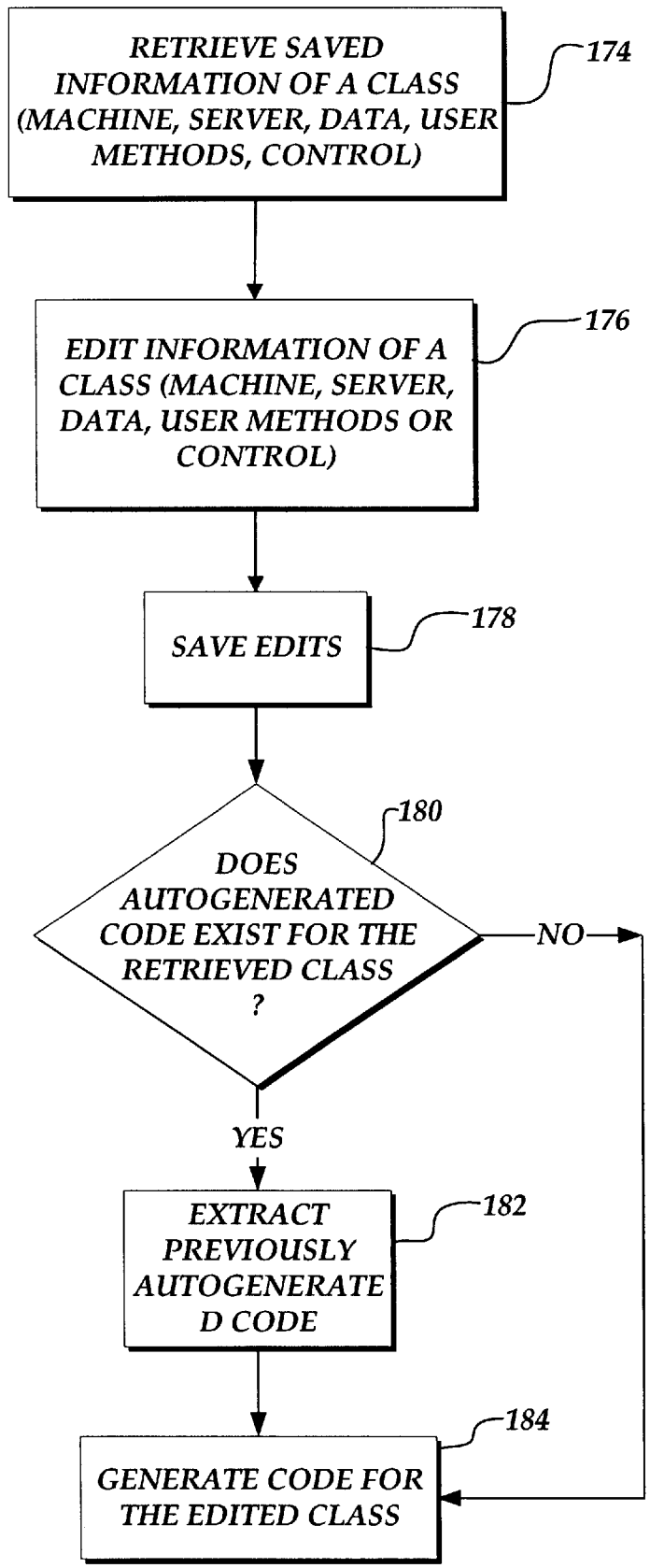

FIG. 8 illustrates the method steps for editing class information of previously created and stored classes. At block 174, the user retrieves the saved information of a class the user wishes to edit. The saved information includes assigned machine name, server name, data name(s), user method name(s), and control information. At block 176, the user edits the retrieved information of the class. Using a graphical interface tool of the type illustrated in FIGS. 9–13 and described below, the user edits any or all of the information previously assigned to a specific class. The user may reassign the class to another machine or redistribute server assignment. This software development tool is a simple and quick object creating tool that allows a user to adapt objects to physical components or application specific requirements that change. The user then saves the edits at block 178. At decision block 180, the system determines if code was previously generated for the retrieved class. If no previously generated code exists, the system generates new code for the defined class, see block 184. However, if previously generated code exists, the system merges the previously generated code for the retrieved class, see block 182, and proceeds to generate code for the newly edited class, see block 184. As will readily be appreciated by one of ordinary skill in the object-oriented programming art numerous types of code extraction and removal techniques can be applied at the step depicted by block 182.

Graphical Interface Tool

FIGS. 9–13 illustrate a graphical interface tool according to one embodiment of this invention. The graphical interface tool easily enables a programmer or someone of lesser skill to enter the information required to describe classes and classes control. The graphical user interface tool allows a programmer or other user to perform the steps described in FIGS. 6–8. For ease in understanding, the information entered into the graphical user interface tool described below defines a class. The class becomes an object when an running program calls the class thus instantiating it as an object. The graphical interface tool shown in FIGS. 9–13, allows a user to define a machine, a server for the machine or a server prestored within the machine from any workstation or computer connected across a network. The displayable windows of the graphical interface tool include multiple interactive icons, buttons, field blocks and menus to enable ease in use. As will be appreciated by one of ordinary skill in the art similar but different interactive window displays may be used to perform the tasks described below. Thus, the following description is to be taken as exemplary, not limiting. The graphical user interface tool's main window 258 is shown in FIG. 9 and described next.

Figure 10:
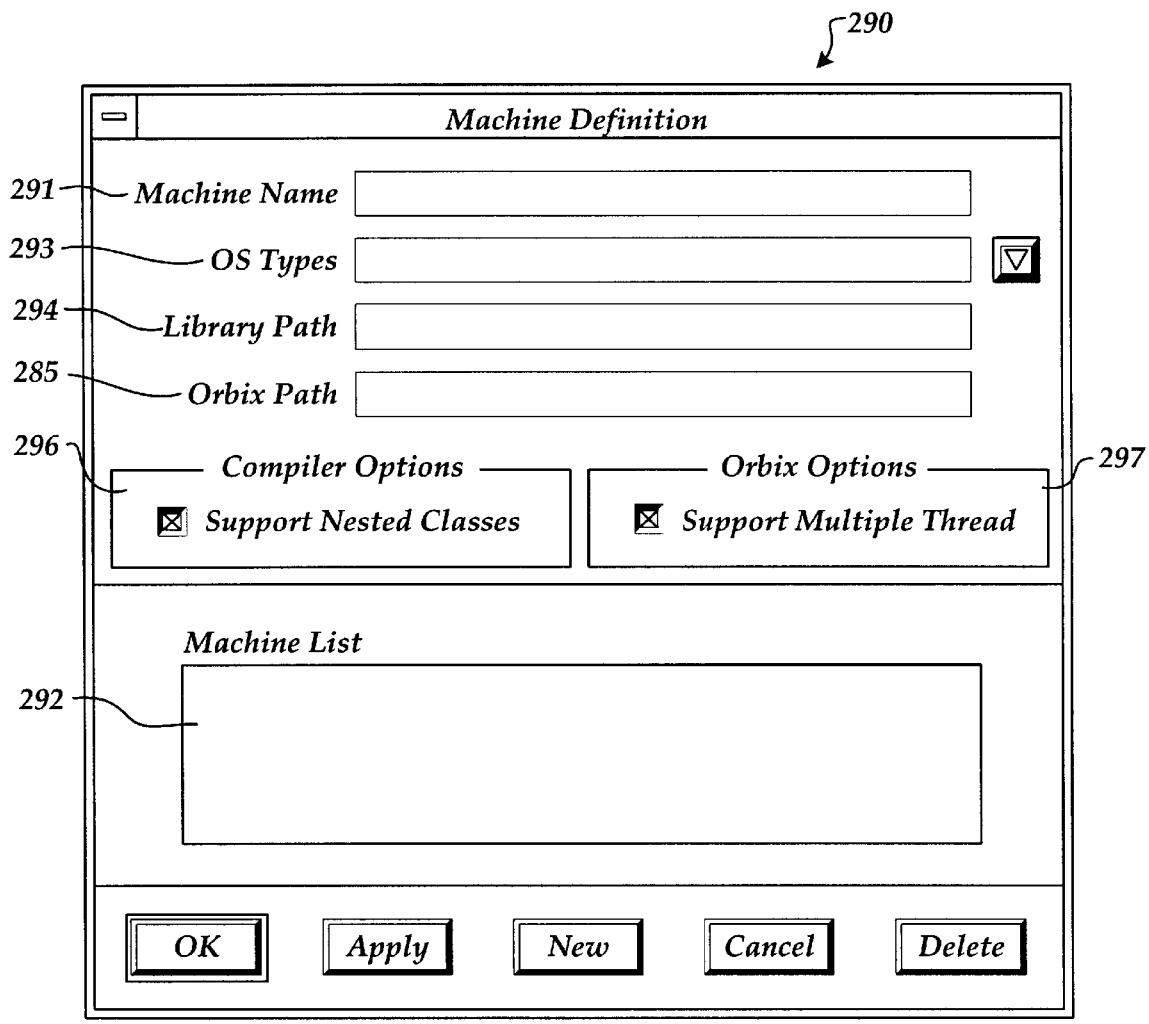
Figure 11:
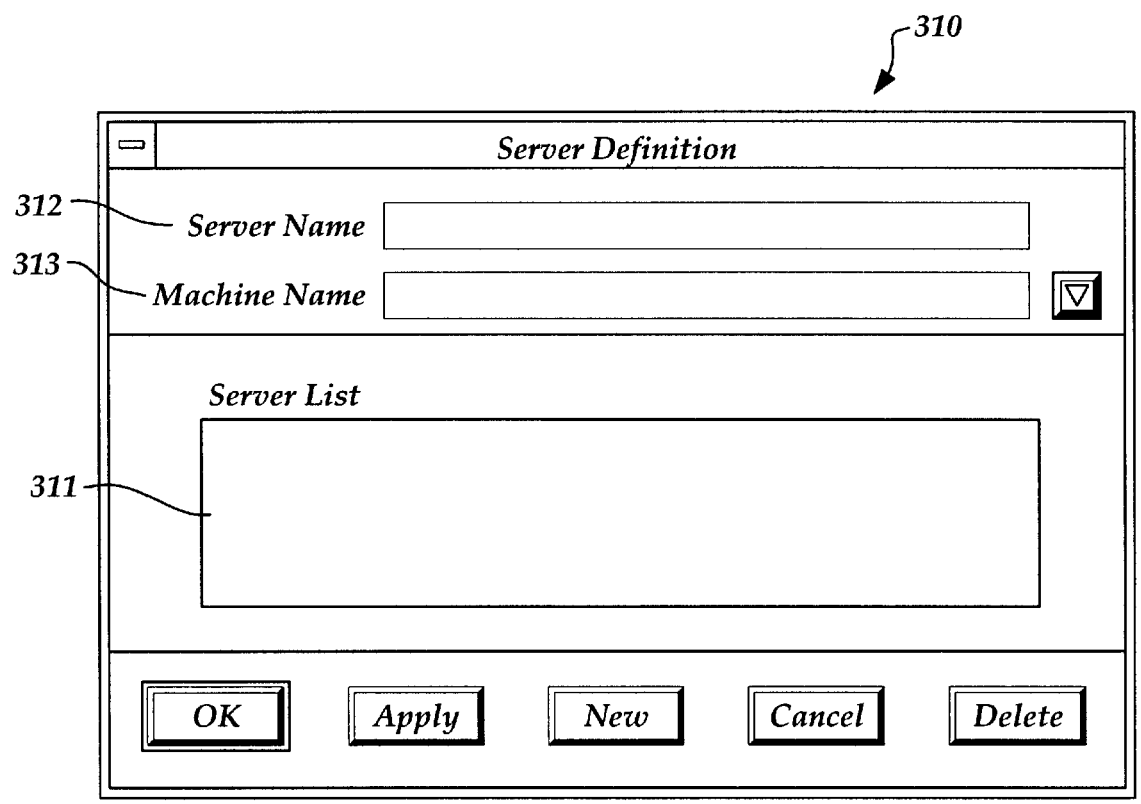

A user must first define the machine and server. Defining the machine and server designates the location a class and where associated control information is stored and performed. The activation of a define machines button 260, located in a button bar at the top of the graphical interface tool window 258, shown in FIG. 9 causes a machine definition window 290 (FIG. 10) to appear. The machine definition window allows a machine for storing and running objects later defined in the graphical interface tool to be defined. As shown in FIG. 10, the machine definition window 290 includes a machine list section 292, a machine name block 291, an operation system (OS) block 293, library and Orbix path blocks 294 and 295 and compiler and Orbix option areas 296 and 297. The machine list section 292 displays a list of machines attached to the network. After the user has selected the machine name from the machine list section 292, a machine name is displayed in the machine name block 291. In OS block 293, the user enters the OS of the designated machine by OS type. The OS type can be set to a default or selected by the user form a list of available OS types. Library path block 294 displays the location of library files important to the operation of the graphical interface tool and machine designation. The location of library files is only of importance to the user, if the user must place the library files in a location different from a default location. Orbix path block 295 displays the location of Orbix files. The user may relocate Orbix files, but these file generally are located at a known default. Orbix is a commercial object request broker (ORB) used by an embodiment of the present invention to provide a transport-layer encapsulator that shields applications from the underlying transports of CORBA. In this regard, as will be readily appreciated by those of ordinary skill in the object oriented programming art if one has to develop or use an object-oriented messaging system similar to CORBA with the present invention, an application for shielding applications from the underlying transports of the ORB is required. Other commercial ORBs operable with the present invention are International Business Machine Corporation's SOM, Digital Equipment Corporation's ObjectBroker, Sun Microsystem Corporation's DOE and Hewlett Packard Corporation's ORB Plus.

In compiler options area 296, the user selects the option displayed if the included C++ compiler can support nested classes. Finally in Orbix options area 297, the user chooses the option displayed, if the Orbix or application used in place of Orbix can support multiple application threads.

The user then designates a server for the designated machine or a server prestored within the designated machine by assigning a server name. To designate a server the user first activates a define servers button 262 located in a button bar at the top of the graphical interface tool window 258 shown in FIG. 9. When this occurs, a server definition window 310 (FIG. 11) opens. The server definition window 310 includes a server list section 311, a server name block 312 and a machine name block 313. The server list section 311 provides a list of servers on or available for use with the machine designated in machine definition windows 290 (FIG. 10). The machine name assigned in machine definition window 290 is displayed in machine name block 313. A user selected name from server list section 311 is displayed in server name block 312.

Returning to FIG. 9, below the button bar section are displayed three other sections: an application name and objects section 263; an object interface section 268; and an object control section 278. The application name and options section 263 includes a current application pathname window 264 and various on/off icons. The current application pathname window 264 displays the location name of a program that includes or will include the information entered into the graphical interface tool. The on/off icons include a debug console icon 265, an object display icon 266 and an exception TRY blocks icon 267. Activation of these icons prior to code generation adds various debugging qualities to the generated code. The debug console icon 265, when activated to the on position by the user, inserts debugging code into generated code. The object display icon 266, when activated, adds code to the generated code for displaying class attributes to one viewing the generated code. The exception TRY blocks icon 267 also allows entry of extra code into generated code. The code entered by an activated exception TRY blocks icon 267 adds code that allows a programmer to easily identify a cause if an error is experienced.

Object interface section 268 includes a define class button 270, a define data button 272 and a define user method button 274. The areas below each button displays user selections. Selection of these buttons retrieve respective interactive windows. As shown in FIG. 12, a class definition window 316 opens upon activation of the defined class button 270. The class definition window 316 includes a class name block 317, a auto start selector 318, an include path block 319, a base class block 320, a server name block 322, a machine name block 323 and a headers and macros section 324. In class name block 317, the user enters a class name that is associated with a property of the class that is being described. This entry will be better understood from the exemplary embodiment of the invention illustrated and described below. Enabling the auto start selector 318 causes the generated code of the class identified to instantiate an object of that class at start-up. The include path block 319 displays the stored location of the class name specified in the class name block 317. In base class block 320, the user specifies any inheritance for the class identified in the class name block 317. The server selected in the server definition window 310 is displayed in server name block 322. The user has the option of changing the name of the server designated to the defined class name by retrieving a server list from a pulldown menu. The machine name selected in machine definition window 290 is displayed in machine name block 323 automatically after server selection. Finally, in the headers and macros section 324, the user enters comments, global class definitions or similar code for execution or display within the to-be-generated shell code.

Figure 13:
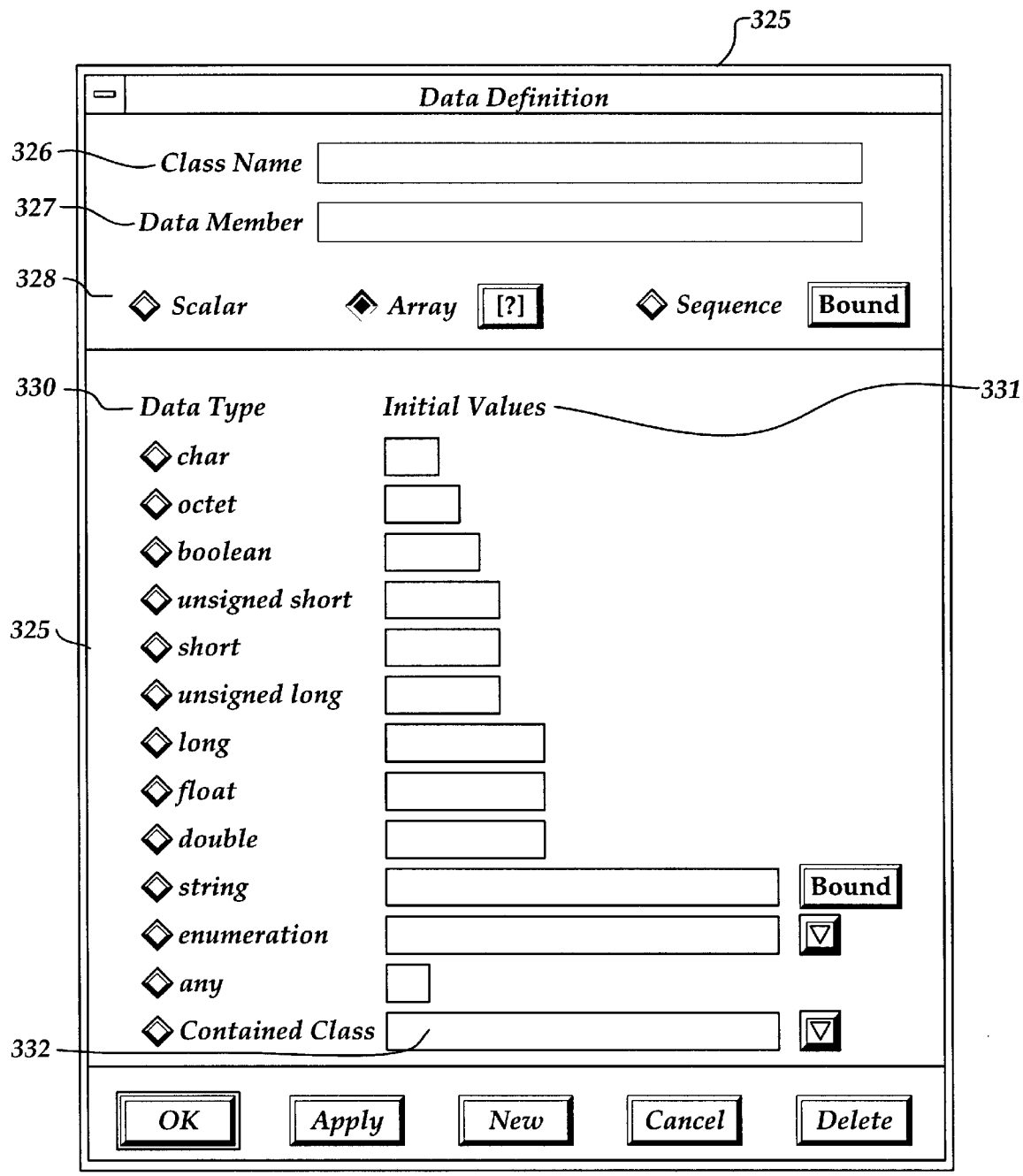

Activation of define data button 272 (FIG. 9) opens a data definition window 325, shown in FIG. 13. The data definition window 325 includes a class name block 326, data member name block 327, a data parameter selection section 328, a data type selection section 330 and an initial value definition section 331. The class name block 326 displays the class name assigned in class definition window 316. In data member name block 327, the user enters a name for one type of data the user wishes to assign to the class name displayed in class name block 326. In data parameter selection section 328, the user determines the parameter type of data defined for the data member named in data member name block 327. The data parameter selection section 328 options include a scalar parameter (a single value), an array parameter (multiple values in an array setting), or a sequence (a CORBA sequence unique to CORBA). In data type section 330, the user selects the data type for the data identified by the name entered in the data member name block 327. The user can define the data as one of the following: character; octet; Boolean; unsigned short; short; unsigned long; long; float; double; string; enumeration; any or Contained Class. All data types in section 330, except for 'contained class,' are CORBA data types. When selected, contained class, section 332a, is an aggregate class data element. As will be appreciated by one of ordinary skill in this art, the underlying architecture determines the data types available for use. After the user has selected one of the data types from data type section 330, the user enters a value in the initial values section 331 of the selected data type. If the user selects the Contained Class data type the user enters a predefined class name into the Contained Class data type initial value 332. The predetermined class name entered into the Contained Class data type initial value 332 is an aggregate of the class name displayed in class name block 326.

Returning to FIG. 9, after selecting the define user method button 274, the user enters names of user methods, thus completing the basic definition of the class and its public interface.

Also shown in FIG. 9, the object control section 278 includes a define state section 280, a define transition section 282, and a define transition methods section 284. Each section of object control section 278 includes a button for activating entry of information. In the define state section 280, the user enters the names of the states that are experienced by the object class entered in define class section 270. Preferably, the user enters state names that uniquely describe states the defined class experiences. An example of this entry is shown in more detail in FIGS. 26–32 and described below. In the define transition section 282, the user enters any transitions between states identified by the entered state names. A transition includes a data condition and a corresponding action. Essentially, the user is defining the action performed on an object if a data condition is met when the object is in a specific state. The data condition can be a specific value of the data entered in the data definition window 325 or an open set of data representing any data condition. The designated Actions may be one or more of the following functions: a call or spawn of a transition method, or a null. A call calls an action that executes and returns. A spawn causes the current application thread to fork into a secondary thread with priority set by user, then performs an action and returns. Finally, a null action automatically unlocks the object's data and returns, essentially performing no action. Transition method names that are assigned to an action are entered by the user in the define transition methods section 284.

After the user has completed entry of the information into object interface section 268 and object control section 278, the user can double-check the entered data specific to the object control by displaying the state diagram of the defined class. A display state diagram button 288 located in the button bar of graphical interface tool window 258, when activated, allows a user to view a state diagram for the class defined. The information entered into the windows associated with the graphical interface tool window 258 is stored in a GUI model that includes structures, linked list, etc. A display generator retrieves the control information stored in the GUI model and displays it in a predefined location on the display for presenting a state diagram, i.e., state names are displayed in ovals representing object states. An example of such a display is illustrated in FIGS. 28–33 and described below.

Once the user is fully satisfied with the information entered into graphical interface tool window 258, the user activates a generate code button 286 that causes application shell code based on the information entered to be automatically generated. The generated code is called application shell code because all code is generated except the specific code for any user method names entered in define user method section 274 and any transition method names entered in define transition method section 284. The specific code for these two types of methods must be entered into specific locations within the application shell code. The user may either enter user and transition method code in the graphical interface tool through an edit function or outside the graphical interface tool through a file editor that allows a programmer to edit and enter code. The user and transition method code entered in the graphical interface tool is automatically entered into the application shell code upon activation of the generate code button 286.

EXAMPLE

Embodiment

Figure 14:
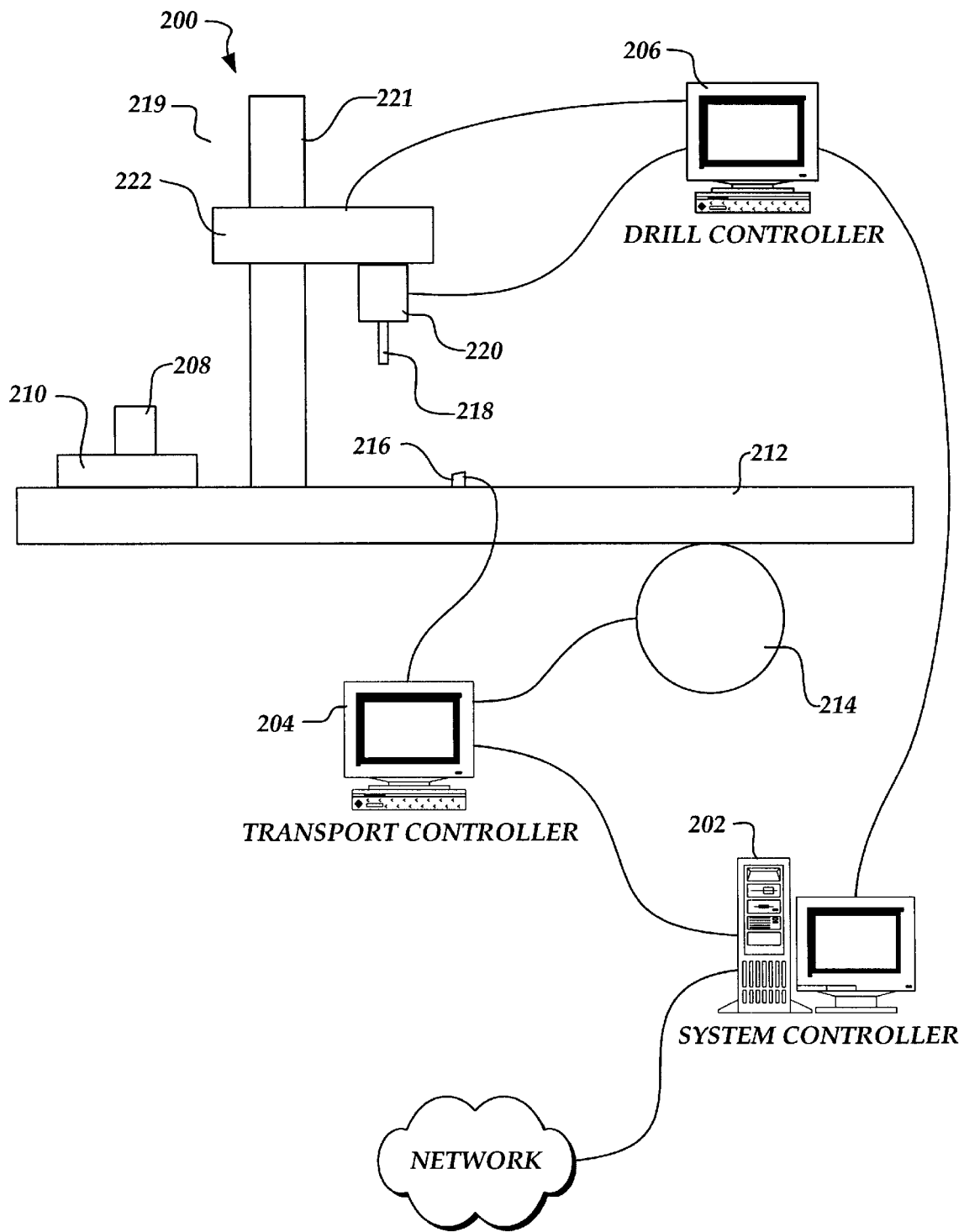
FIG. 14 is a schematic diagram illustrating a system controlled by code constructs created by the present invention.

FIG. 14 is a schematic illustration of an exemplary application of the present invention. The illustration comprises a production system 200 for drilling holes in parts. The production system 200 includes a transport 212 powered by transport motor 214. The transport transports a palette 210 that supports part 208 to be drilled to a drill assembly 219. The transport 212 includes one or more sensors 216 for sensing when palette 210 is properly positioned. The drill assembly 219 includes a vertical support 221 for receiving a horizontally mounted elevator 222 that moves vertically on the vertical support 221. Attached to the outer end of the horizontally mounted elevator 222 is a drill motor 220 that extends over the transport 212, at a predefined position. The drill motor 210 rotates a vertically oriented drill 218.

In operation, the transport motor 214 causes transport 212 to move the palette 210 until the sensor(s) 216 senses that the palette 210 is in the appropriate position. When the palette 210 reaches the appropriate position, the transport motor 214 shuts off stopping operation of the transport 212 and, thus, movement of the palette. It is assumed that the position of the part 208 on the palette 210 is precisely known and that each time a part is placed on the palette the part is placed in precisely the same position. Therefore stopping of the palette 210 at a precise location places the part 208 at a precise location relative to the drill assembly 219. In this example, the transport motor 214 is a single speed motor, i.e., the transport motor is either on or off, and the drill motor 220 is a variable speed motor. After the palette 210 is positioned, the part 208 is ready to be drilled by the drill assembly 219. First the speed of the drill motor 220 is set to the proper drilling speed for the drill 218. Then the horizontally mounted elevator 222 is lowered. As the elevator 222 is lowered, the drill 218 drills a hole in the part 208. After drilling is complete, the horizontally mounted elevator 222 raises the drill 218 above that the part 208 and the drill motor 220 is turned off. Next, the transport motor 214 is energized, causing the transport 212 to move the palette 210 away from the drill assembly 219. After the palette is removed, system 200 waits for another palette to be placed on the transport.

Also shown in FIG. 14 are computer work stations that interact with various components of the production system 200 for controlling the operation described above. A transport controller 204 is connected to the sensor(s) 216 and to the transport motor 214. A drill controller 206 is connected to the horizontally mounted elevator 222 and to the drill motor 220. A system controller 202 is connected to the drill controller 206 and transport controller 204. The system controller provides overall production system control. System controller 202 is also connectable to a client/server network that may include other computer controllers that control other operations (not shown) performed on part 208 or other parts associated with a final assembly.

It is well understood that an object-oriented program operating on the computers 202, 204, and 206 can effectively control the physical components of the production system 200. Once the programmer has determined the control required for the application described above, the programmer creates classes that represent the physical components of the production system 200. Then, the programmer generates the code necessary to perform the application specific operations on the created classes.

Figure 15:
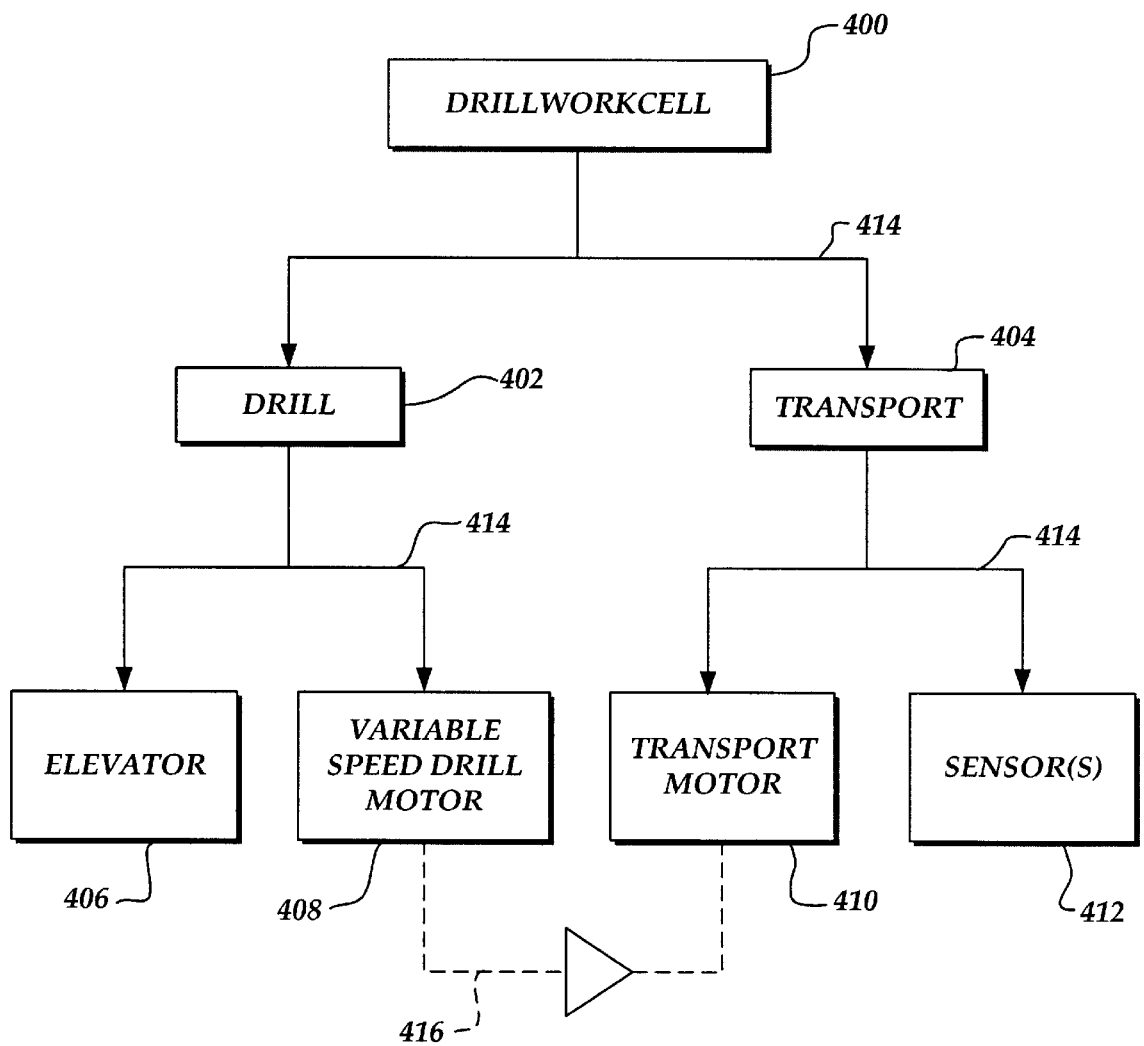
FIG. 15 is a block diagram illustrating the class relationship between the objects associated with the system depicted in FIG. 14.
Figure 16:
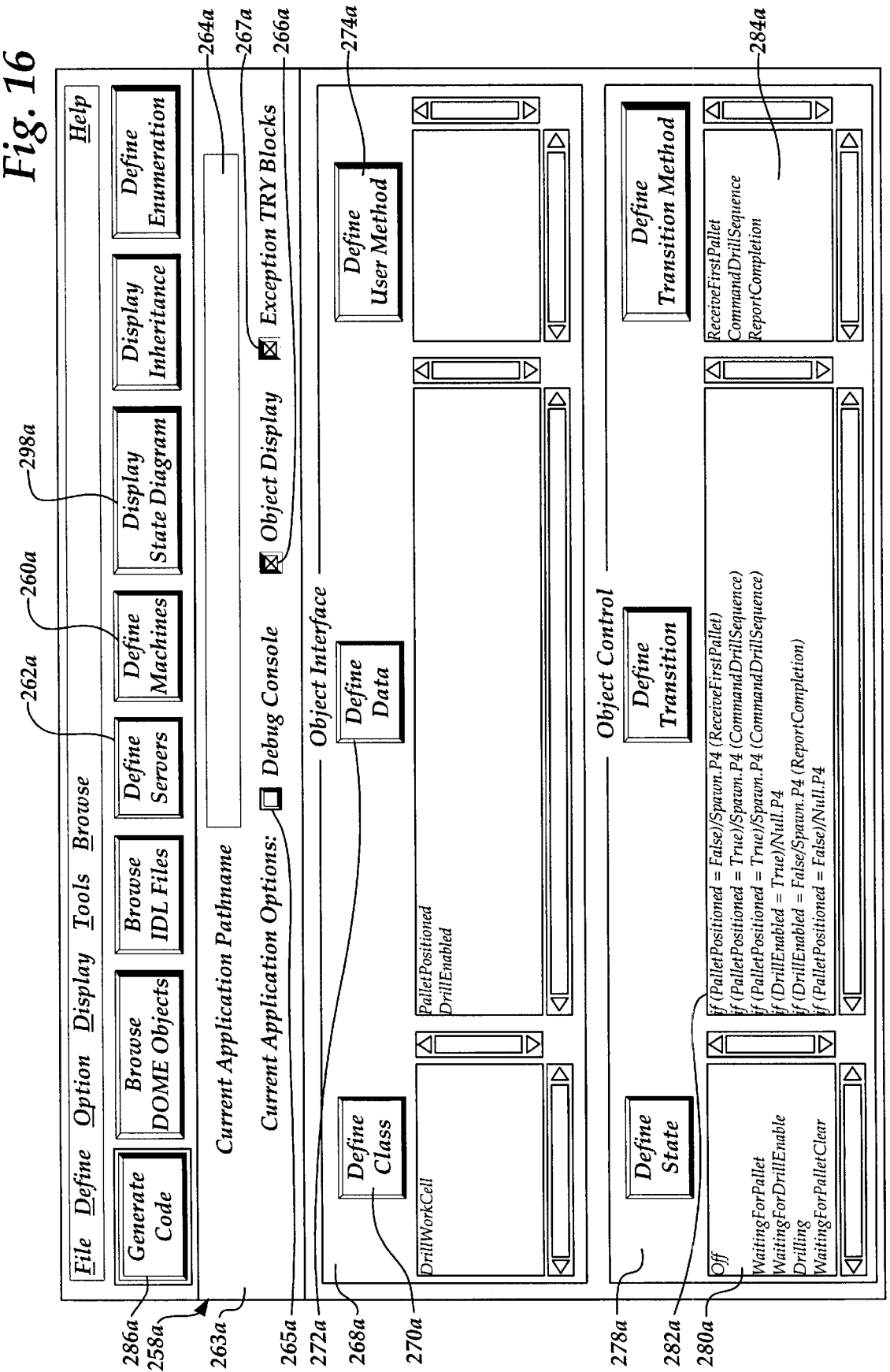
FIGS. 16–26 are display screen shots illustrating the inputted data for the system shown in FIG. 14.
Figure 17:
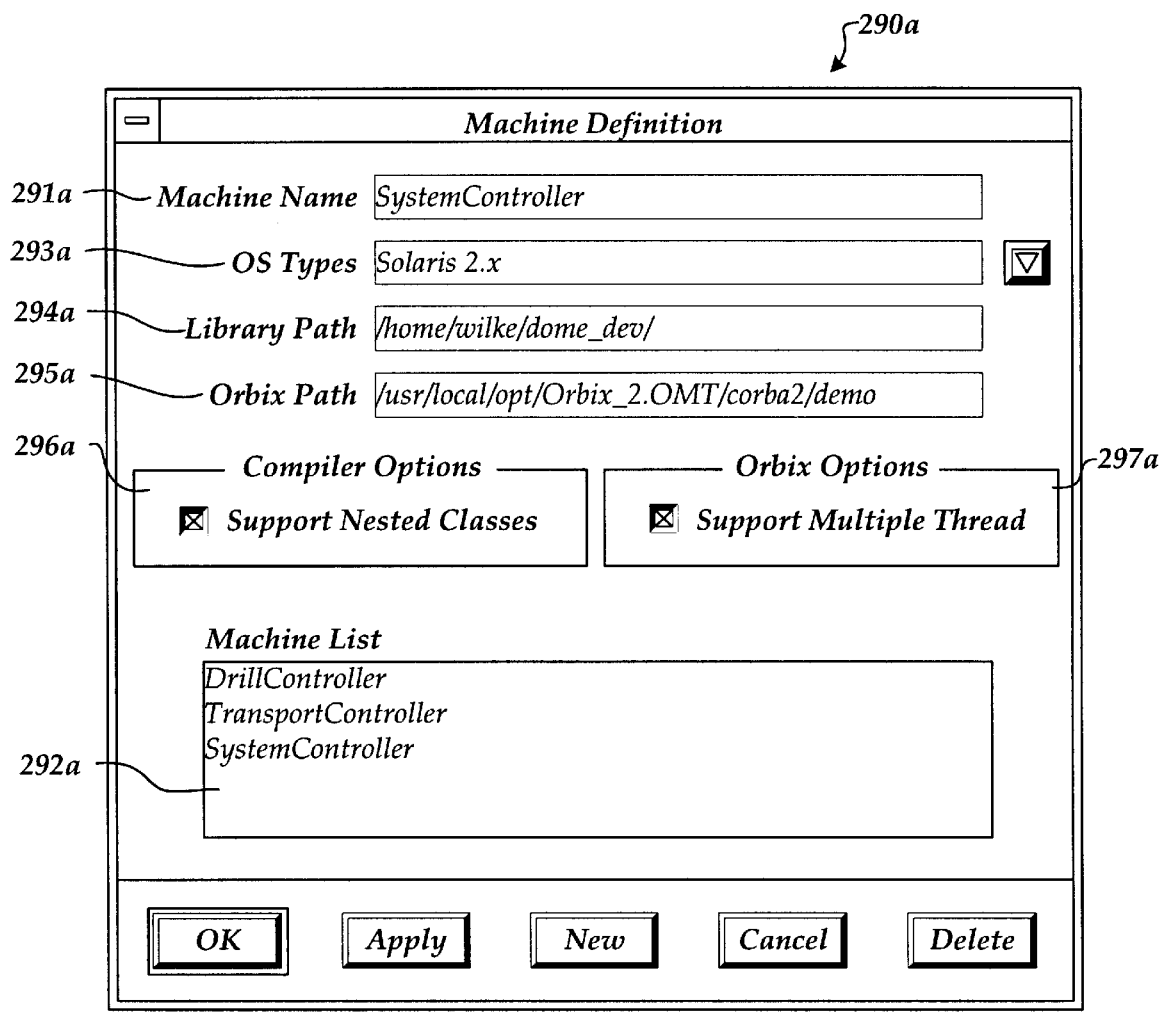

FIG. 15 is a class hierarchy diagram for the production system depicted in FIG. 14 and implemented in the manner shown in FIGS. 16–26 and described below. The highest class is denoted DrillWorkCell 400. Two classes denoted Drill 402 and Transport 404 are aggregates of the DrillWorkCell class 400. Two classes denoted Elevator 406 and Variable Speed Drill Motor 408 are aggregates of Drill class 402 and two classes denoted Transport Motor 410 and Sensor(s) 412 are aggregates of Transport class 404. Aggregate assignments are defined in the classes data definition window(s) 325 (FIG. 13). Dashed line 416 illustrates the fact that the Variable Speed Drill Motor class 408 has assigned inheritance from the Transport Motor class 410. The graphical interface tool depicted in FIGS. 16–26 and described below can be run on any of the controllers shown in FIG. 14, namely the transport controller 204, the drill controller 206, the system controller 202, or any compatible computer system connected via the network to the system controller 202.

FIGS. 16–20 show the entered object interface information and object control information for class DrillWorkCell 400. For ease of understanding the reference numbers used with the objects displayed in FIGS. 16–26 are the same as those used in FIGS. 9–13 with the addition of an "a" to distinguish between the FIGURES. As shown in FIG. 15 and described above, DrillWorkCell is the class that represents production system 200 (FIG. 14). Class DrillWorkCell includes the PalettePositioned and DrillEnabled data and no user methods. DrillWorkCell has five possible states defined by state names entered in the define state section 280a. The states are: Off; WaitingForPalette; WaitingForDrillEnable; Drilling; and WaitingForPaletteClear. DrillWorkCell includes six transitions between the states and four named transition methods shown in sections 282a and 284a, respectively. These transitions and transition methods are described in more detail below in a state diagram shown in FIG. 28.

FIGS. 17–20 show interactive windows similar to FIGS. 10–13 containing user entered and default information associated with DrillWorkCell class. The machine definition window 290a shown in FIG. 17, opened when the define machine button 260a (FIG. 16) is activated shows that the user has selected the machine named SystemController from the machine list section 292a. The machine list section 292a includes the name of the machines shown in FIG. 14 and described above. The OS block 293a designates Solaris 2.x as the OS used in this example. The library path block 294a and the Orbix path block 295a display default address locations for the respective associated components. The compiler options area 296a and the Orbix options area 297a are shown as selected for implementation.

Figure 18:
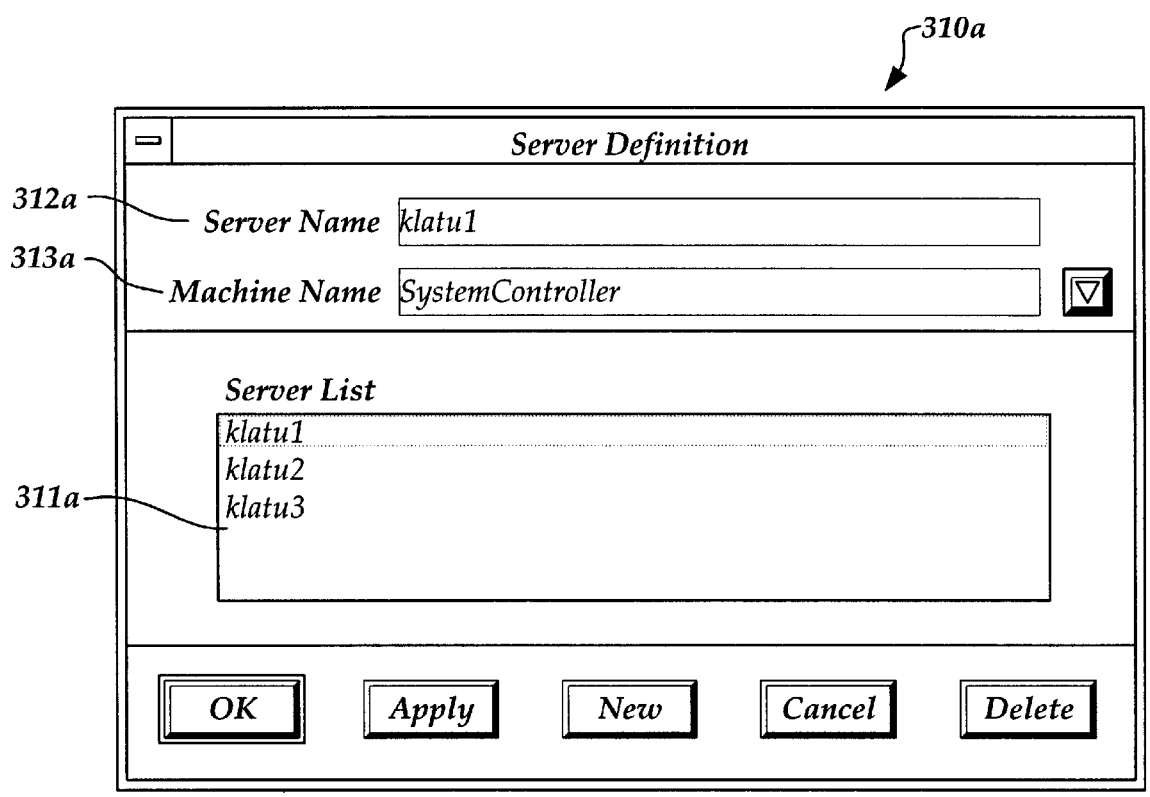

The server definition window 310a shown in FIG. 18 that is opened when the define server button 262a (FIG. 16) is activated shows klatu1 as the designated server. Klatu1 also appears in the server list section 311a along with other available servers.

Figure 19:
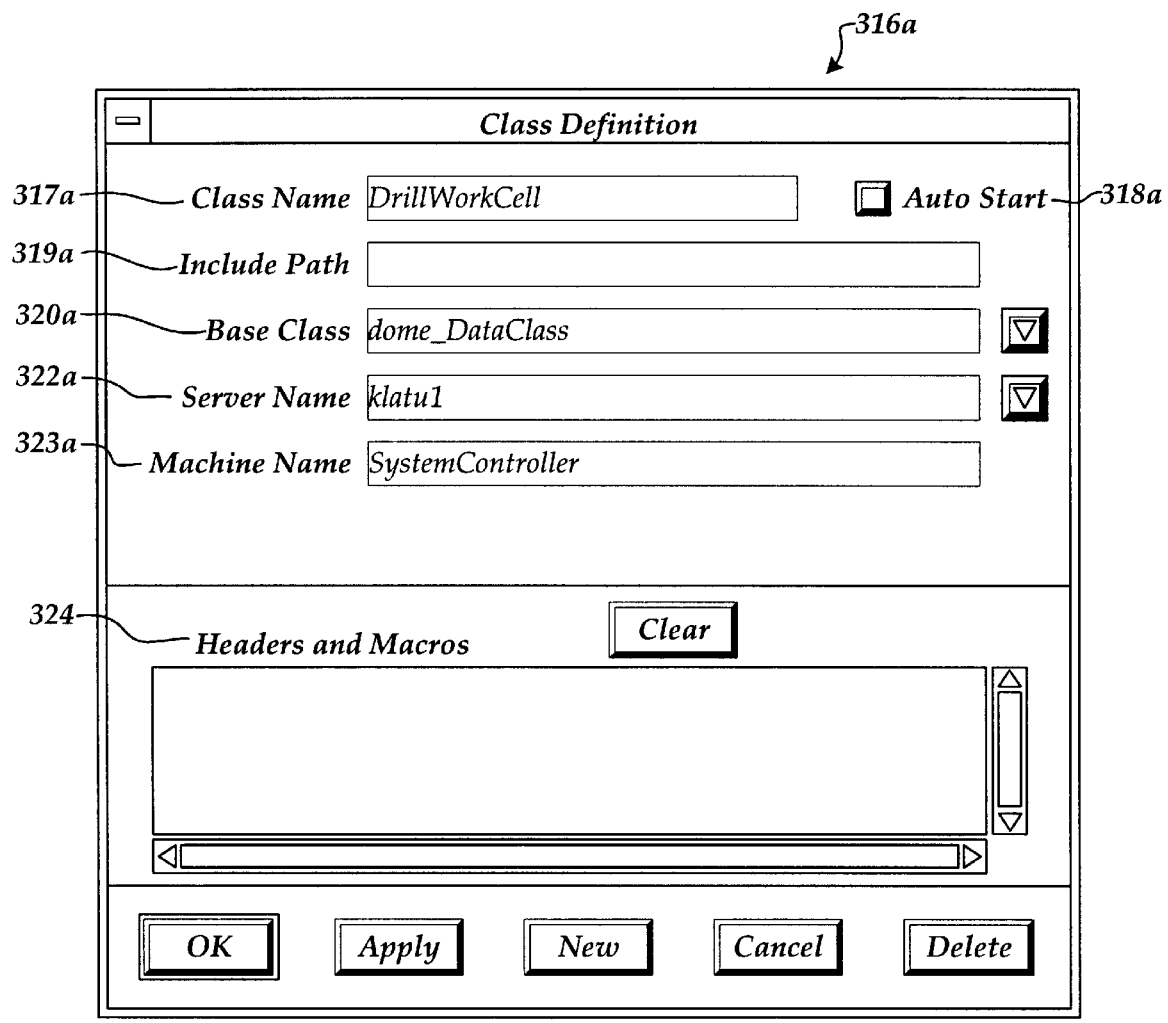

The class definition window 316a shown in FIG. 19, which opens when the class definition button 270a is activated displays information related to DrillWorkCell. Auto start selector 318a has been selected, therefore DrillWorkCell will automatically be instantiated upon start-up of production system 200. Include path block 319a is empty, because DrillWorkCell class is defined in this application and is not retrieved from another application. Base class block 320a displays dome_DataClass. Dome_DataClass is the base class for classes that do not have a formal parent class. Similar to base classes in other object-oriented environments, Dome_DataClass contains the information required for this embodiment of the present invention to be operable. Server name block 312a and machine name block 313a list klatu1 and SystemController, respectively. No information has been entered into headers and macros section 324a.

Figure 20:
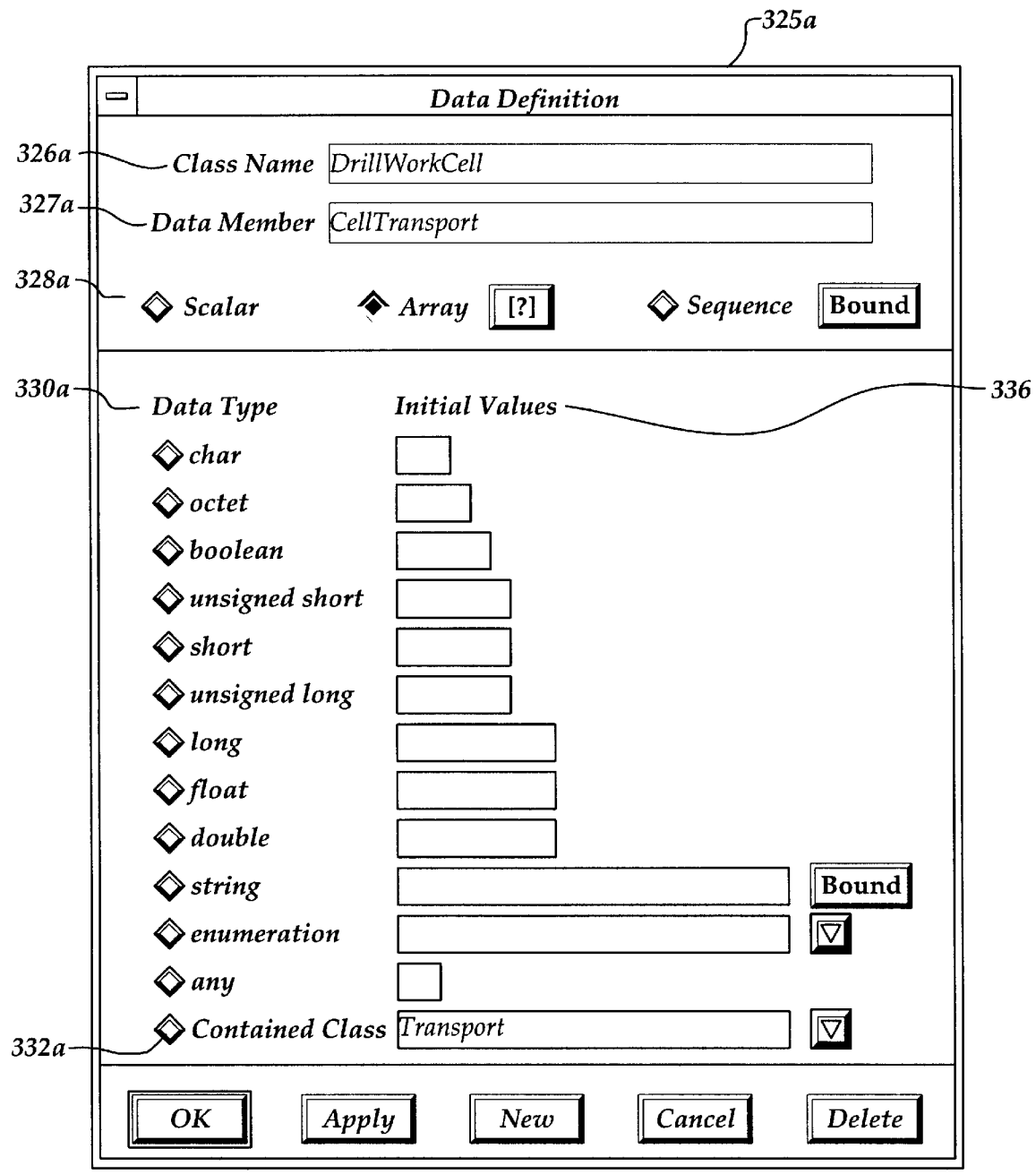

The data definition window 325a, shown in FIG. 20, which opens when the define data button 272a (FIG. 16) is activated, shows Cell Transport data 327a has been entered and the array parameter 328a selected. In data type selection section 330a the data PalletPositioned has been designated as Transport in the type contained class. Therefore, instantiation of Cell Transport data will instantiate Transport class, because of the aggregate relationship assigned in the data type selection section 330a.

Figure 21:
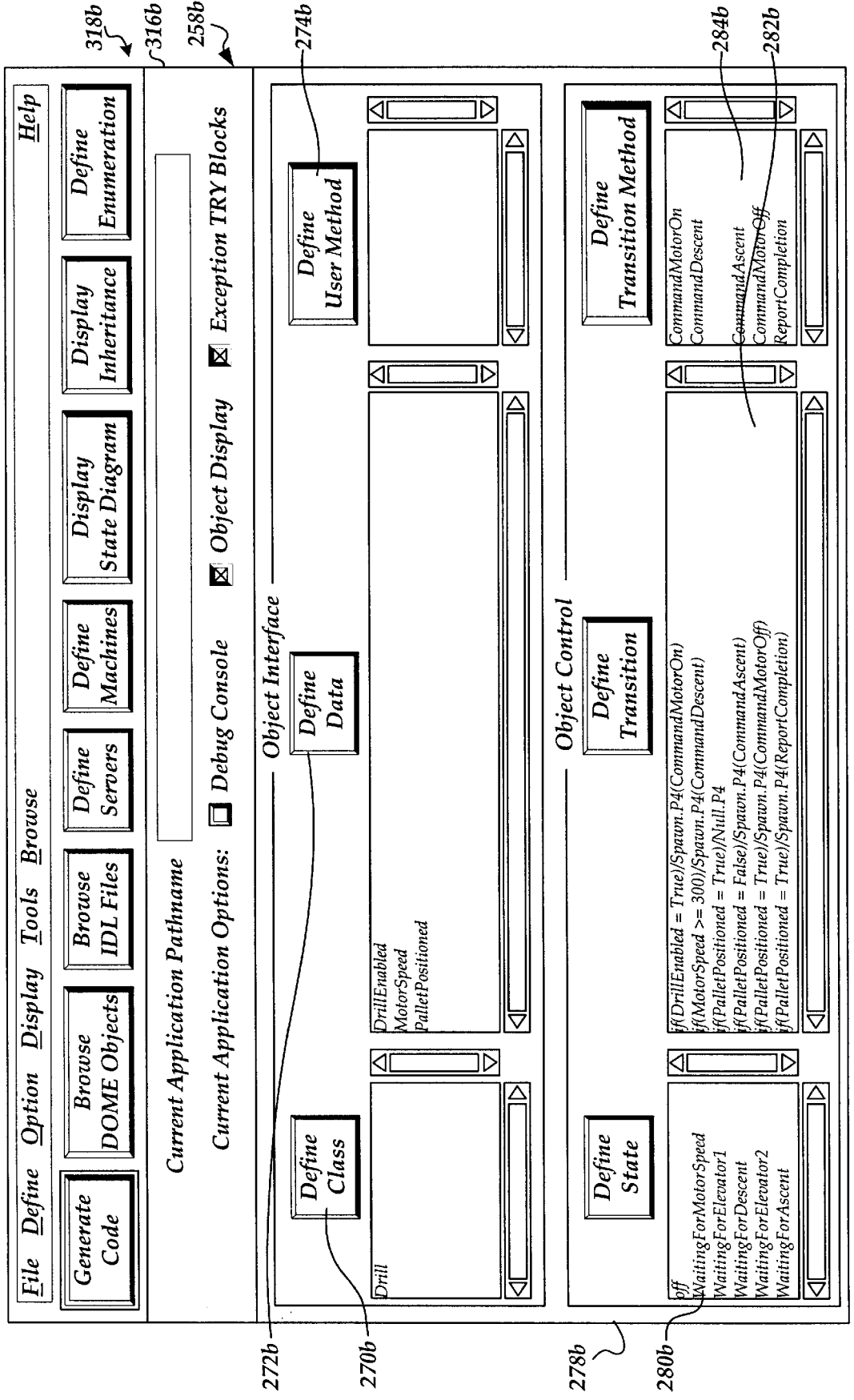
Figure 22:
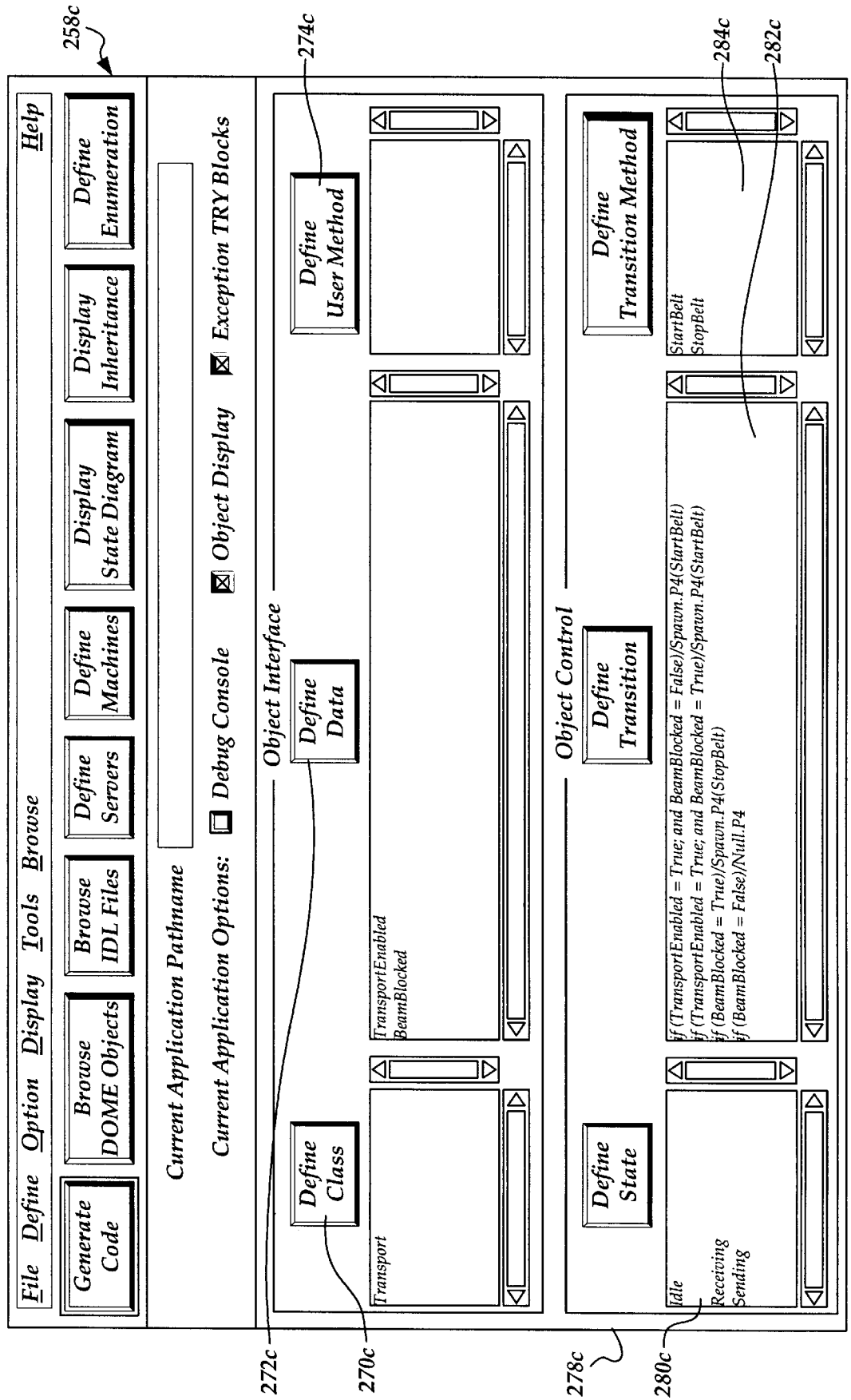
Figure 23:
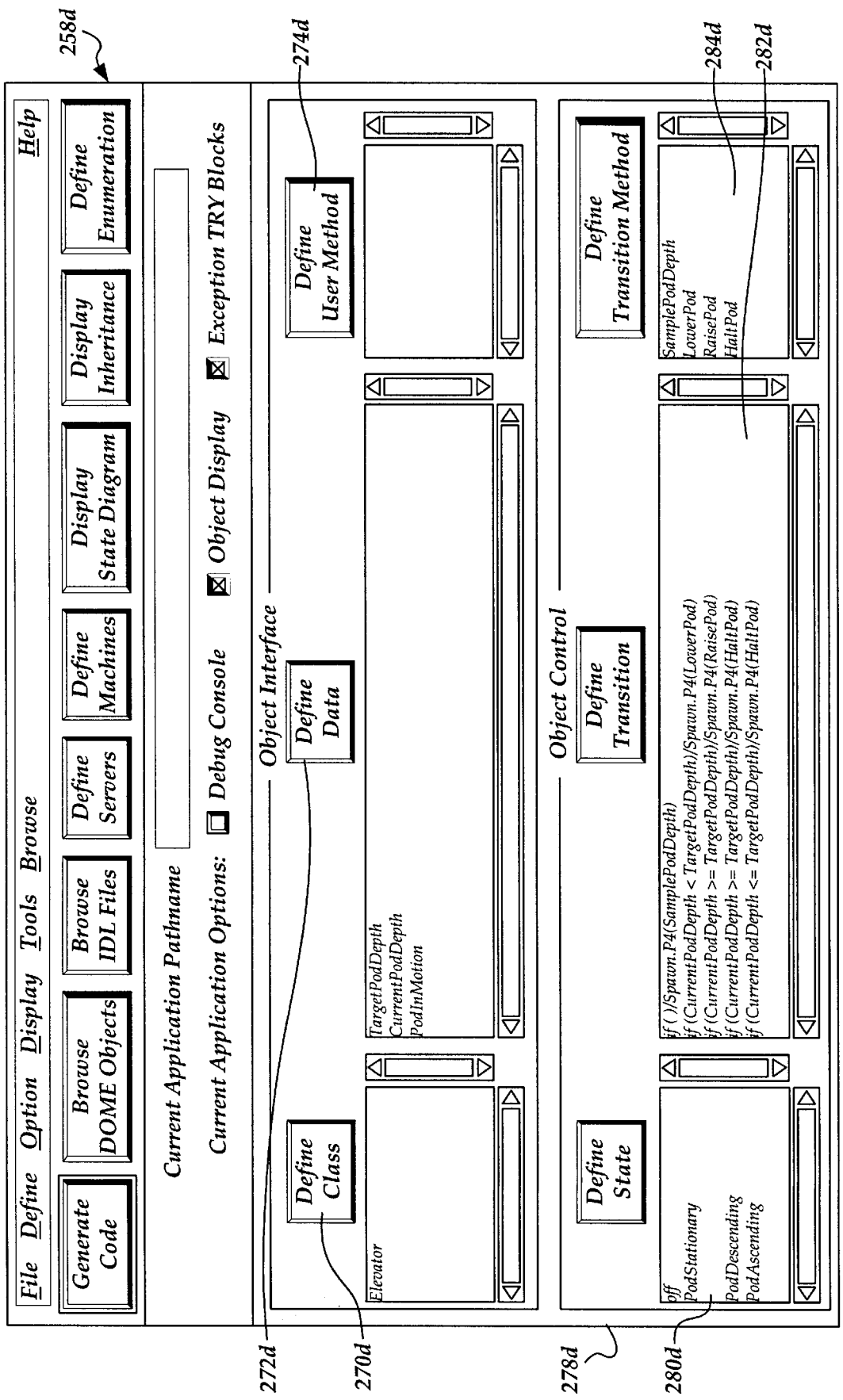
Figure 24:
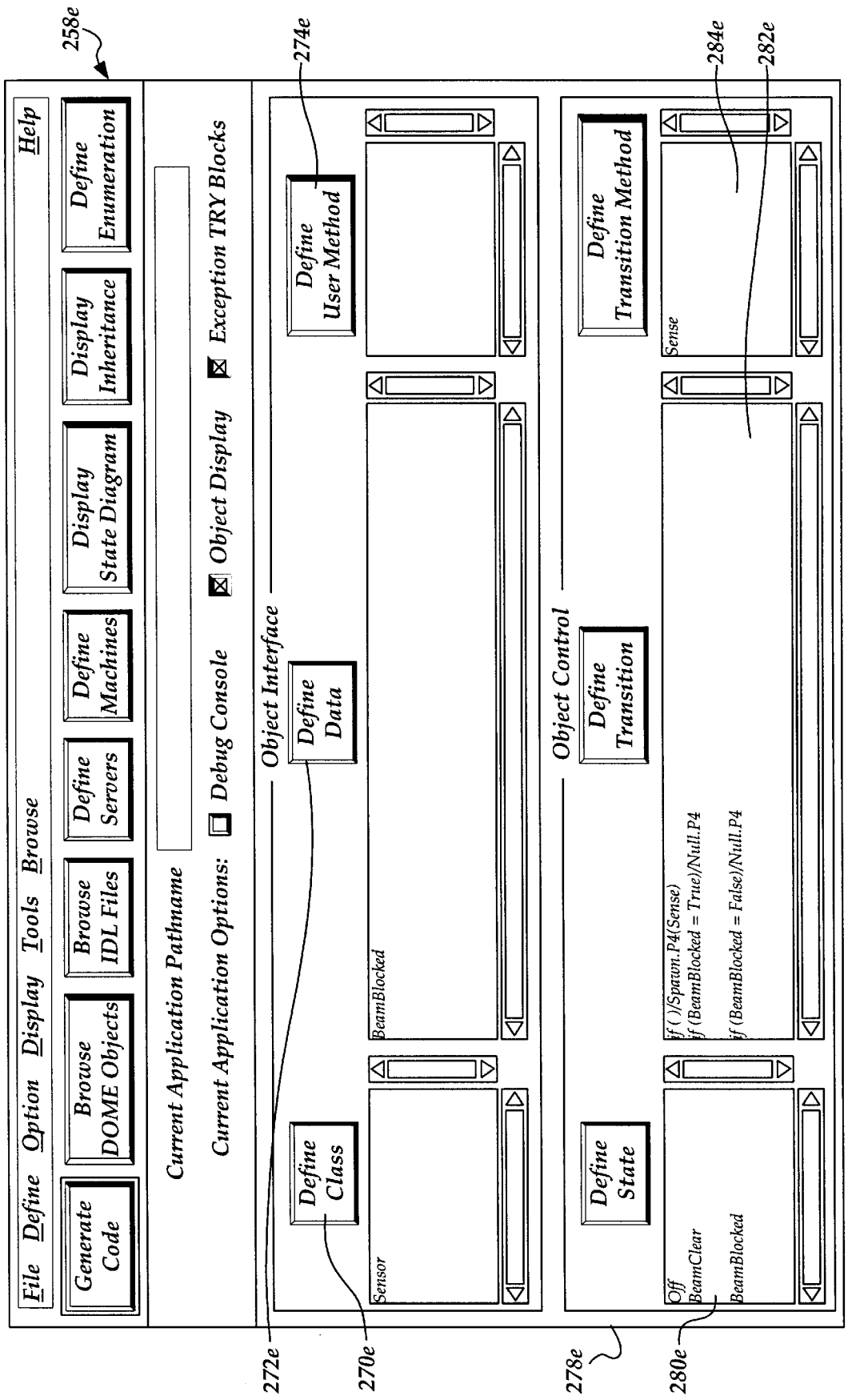
Figure 25:
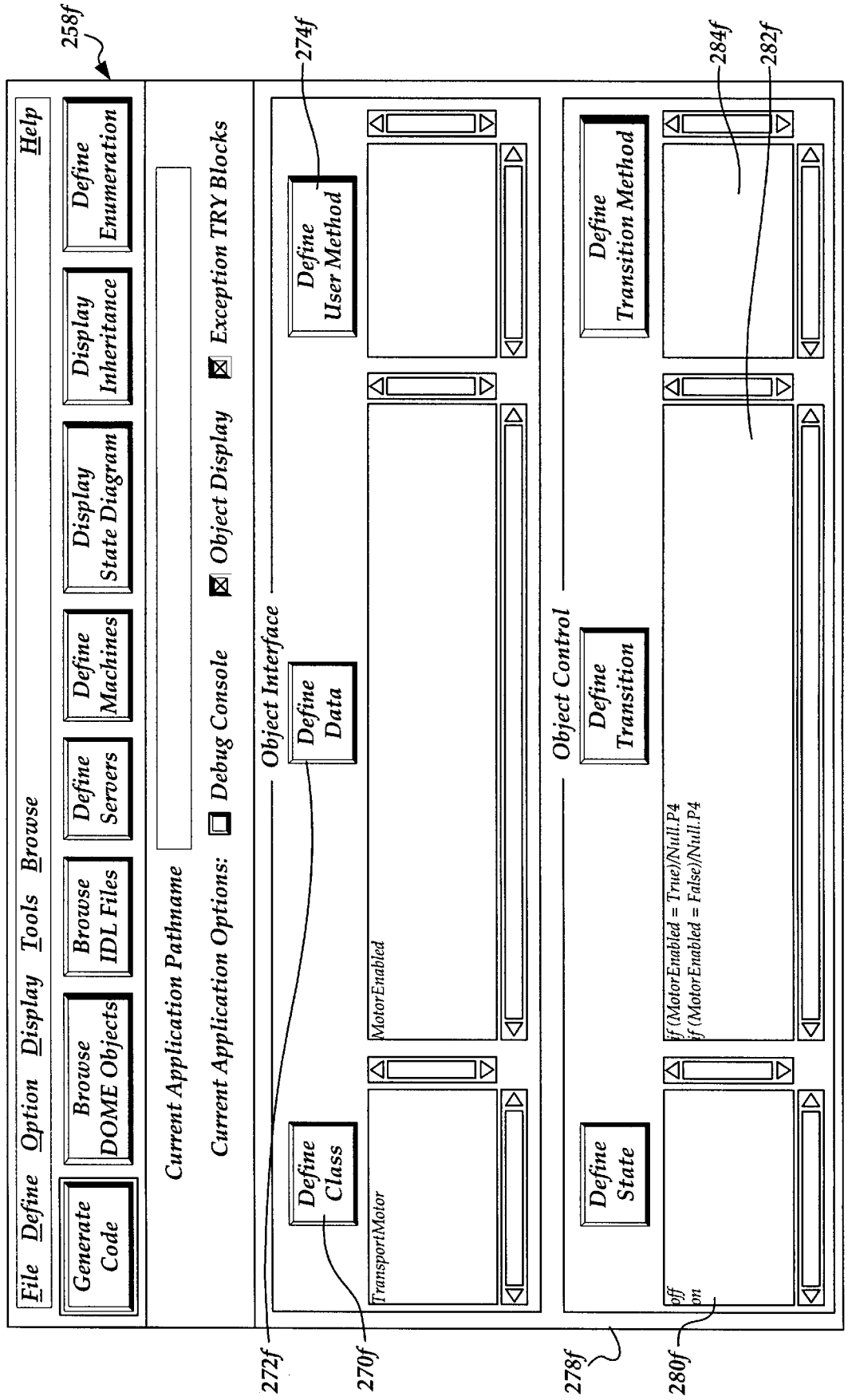
Figure 26:
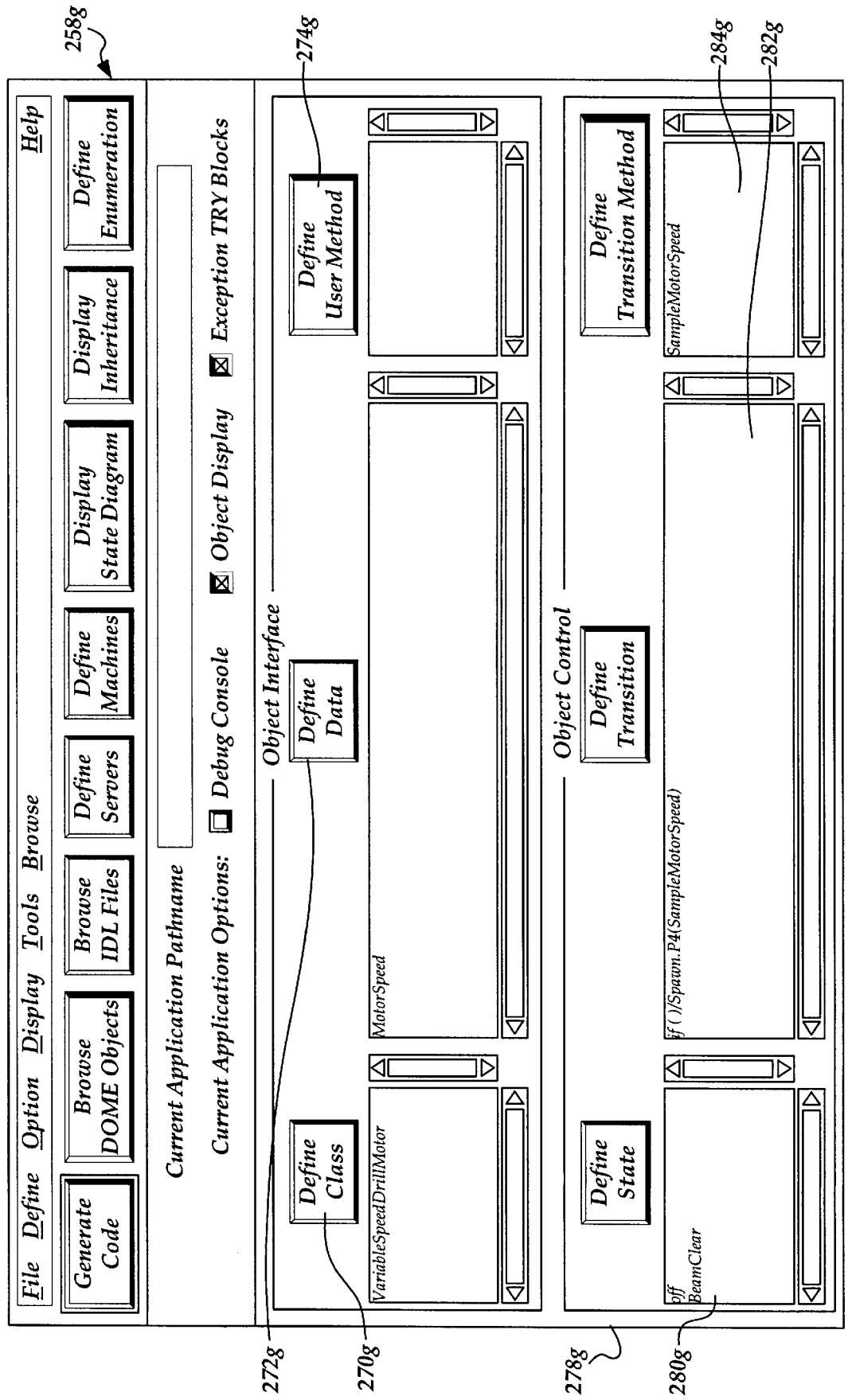

FIGS. 21–26 illustrate the information entered into graphical interface tool window 258 for all the other defined classes for production system 200. For ease of illustration and in order to avoid unnecessary repetition, the individual windows that are opened when the above described buttons are activated are not illustrated. FIG. 21 illustrates Drill class 403, which represents the drill 218. FIG. 22 illustrates the Transport class 404, which represents the transport 212. FIG. 23 illustrates the Elevator class 406, which represents the elevator 222. FIG. 24 illustrates the Sensor class 412, which represents the sensor(s) 216. FIG. 25 illustrates the Transport Motor class 410, which represents transport motor 214. FIG. 26 illustrates the Variable Speed Drill Motor class 408, which represents the multispeed motor, drill motor 220.

The Drill class definition window 258*b* shown in FIG. 21 displays user inputted information for the Drill class. As shown in the defined data section 272*b*, Drill class includes the DrillEnabled, MotorSpeed and PalletPosition data. As shown in the defined state section 280*b*, the Drill class exhibits five states defined by the state names: Off, WaitingForMotorSpeed; WaitingForElevator1; WaitingForDescent; WaitingForElevator2; and WaitingForAscent. The Drill class also includes transitions between states listed in the defined transition section 282*b*. Five transition methods and a null are listed in the defined transition section. The defined transition method section 284*b* defines the transitions, which are also shown in parenthesis in the define transition section 282*a*. These transitions are better shown in a Drill state diagram (FIG. 29) and described below.

The Transport class definition window 258*c* is shown in FIG. 22. The defined class 270*c* of this window notes that the class in Transport. The define data section 272*c* includes TransportEnabled and BeamBlocked data. The define state section 280*c* notes that the Transport class includes the Idle, Receiving and Sending states. The defined transition section 282*c* of the Transport class lists two transitions and a null. The defined transition method section 284*c* identifies the two transition methods. The states and transitions are better illustrated in a Transport class state diagram shown in FIG. 30 and described below.

As shown in FIG. 23, the defined data section 272*d* of the Elevator defined class 270*d* includes the TargetPodDepth and CurrentPodDepth data. Pod corresponds to elevator. The defined state section 280*d* of the Elevator class includes four states: Off; PodStationary; PodDescending; and PodAscending. The defined transition section 282*d* of the Elevator class lists user defined transitions between the Elevator class states. Four transitions, which are defined in the transition method section 284*d* are listed. They are: SamplePodDepth; LowerPod; RaisePod; and HaltPod. These states and transitions are better illustrated the Elevator state diagram shown in FIG. 31 and described below.

As shown in FIG. 24, the define data section 272*e* of the Sensor defined class 270*e* includes BeamBlocked data. As shown in the define state section 280*e*, the Sensor class includes three states: Off; BeamClear; and BeamBlocked. The Sensor class includes one transition method and two nulls shown in the define transition section 282*e* listed in the define transition method section 284*e*. The states and transitions of the Sensor class are better illustrated in the Sensor state diagram shown in FIG. 32 and described below.

As shown in FIG. 25, the define class section 270*f* of the Transport Motor class window displays Transport Motor to identify Motor class. The define data section 272*f* lists Motor Enabled data. The Motor class includes two defined states, Off and On, shown in the define state section 280*f*. Two transition nulls are listed in the define transition section 282*f*. No transition methods are required for Motor class, as shown in the define transition method section 284*f*. These are better illustrated in the Transport Motor state diagram shown in FIG. 33 and described below.

As shown in FIG. 26, the define class section 270*g* of the Variable Speed Drill Motor class window 258*g* displays the variable speed Drill Motor class. As shown in the define data section 272*g*, the Variable Speed Drill Motor class includes MotorSpeed data. The define state section 280*g* of the Variable Speed Drill Motor class includes two states: Off and BeamClear. One state transition is listed in the define transition section 282*g*, which is defined in the define transition method section 284*g* as Sample Motor Speed. These are better illustrated in the Variable Speed Drill Motor Starter diagram shown in FIG. 34 and described below.

Figure 27:
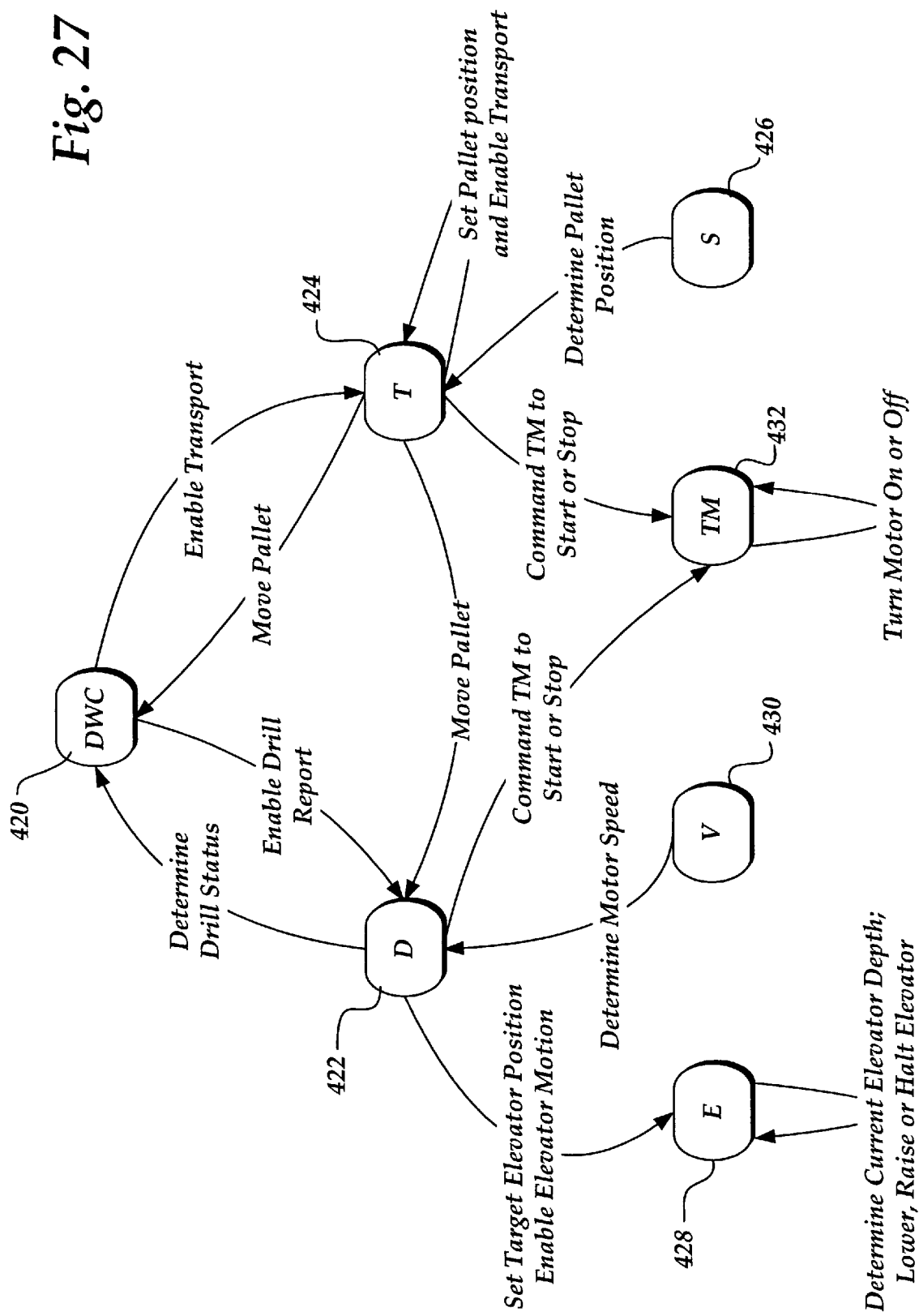
FIG. 27 is a block diagram illustrating the effect objects have on other objects within the system shown in FIG. 14.

Before describing the individual state diagrams, it is important to get a better understanding of the interrelationship the objects have with each other. Each oval represents an object: DWC 420 is DrillWorkCell; D 422 is Drill; T 424 is Transport; S 426 is Sensor; E 428 is Elevator; TM 430 is TransportMotor; V 432 is VariableSpeedDrillMotor. As shown in FIG. 27, the objects are represented in the same hierarchical manner as FIG. 15. Also included are arrows that show any affects one object has upon other objects. The arrows and attached titles represent the execution of an action which corresponds to a specific transition method(s). For example, two arrows begin at DWC 420. A first arrow extends to D 422. The first arrow includes the actions Enable Drill and Report which indicates the DrillWorkCell object determines when the drill starts operations and requests Drill status. The actions Enable Drill and Report correspond to the transition methods CommandDrillSequence and ReportCompletion, respectfully. A second arrow extends to T 424. The second arrow includes the action Enable Transport which indicates the DrillWorkCell object determines when the transport can begin operation. The action Enable Transport corresponds to the transition method ReceiveFirstPallet created for the DrillWorkCell object.

D 422 has three arrows extending from it. A first arrow with the action Determine Drill Status corresponds to the ReportCompletion transition method. The first arrow extends to DWC 420, thereby reporting drill status to the Drill Work Cell. A second arrow with actions Set Target Elevator Position and Enable Elevator Motion extends to E 428. According to the second arrow actions, D 422 sets the target elevator position and enables elevator motion, respectively. The Set Target Elevator Position action corresponds to the CommandDescent transition method and the Enable Elevator Motion action corresponds to the CommandAscent transition method. The final arrow extending from D 422 extends to TM 430. As per the third arrow's action, Command TM (transport motor) to Start or Stop, D 422 commands the transport motor to begin or stop operation. The commands indicated by the third arrow correspond to the CommandMotorOn and CommandMotorOff transition methods of the Drill object.

T 424 also has three arrows extending from it. A first and second arrow includes the action Move Pallet. The first arrow extends to DWC 420 and the second to D 422. The Move Pallet action corresponds to the StartBelt and StopBelt transition methods. Essentially, the Transport reports to the Drill and Drill Work Cell that the pallet is in motion. The third arrow extends to TM 430 with the action Command TM to Start or Stop. These actions also correspond to the StartBelt and StopBelt transition methods.

S 426 has one arrow extending to T 424. The arrow includes the action Determine Pallet Position which corresponds to the Sense transition method. The Sensor is telling the Transport where the pallets are presently located.

E 428 also has one arrow extending from it. This arrow only affects E 428 as indicated by the arrow pointing back at E 428. The actions performed are determining current elevator depth and lowering, raising and halting the elevator. The corresponding transition methods are SamplePodDepth, LowerPod, RaisePod and HaltPod, respectively.

TM 430 also has a recursive arrow. The action associated with the arrow indicates when to turn the motor on or off.

This action corresponds to the TurniMotorOn and TumMotorOff transition methods.

V 432 has one arrow extending to D 422. The arrow action performed is a determination of the motor speed. This action corresponds to the SampleMotorSpeed transition method.

Figure 28:
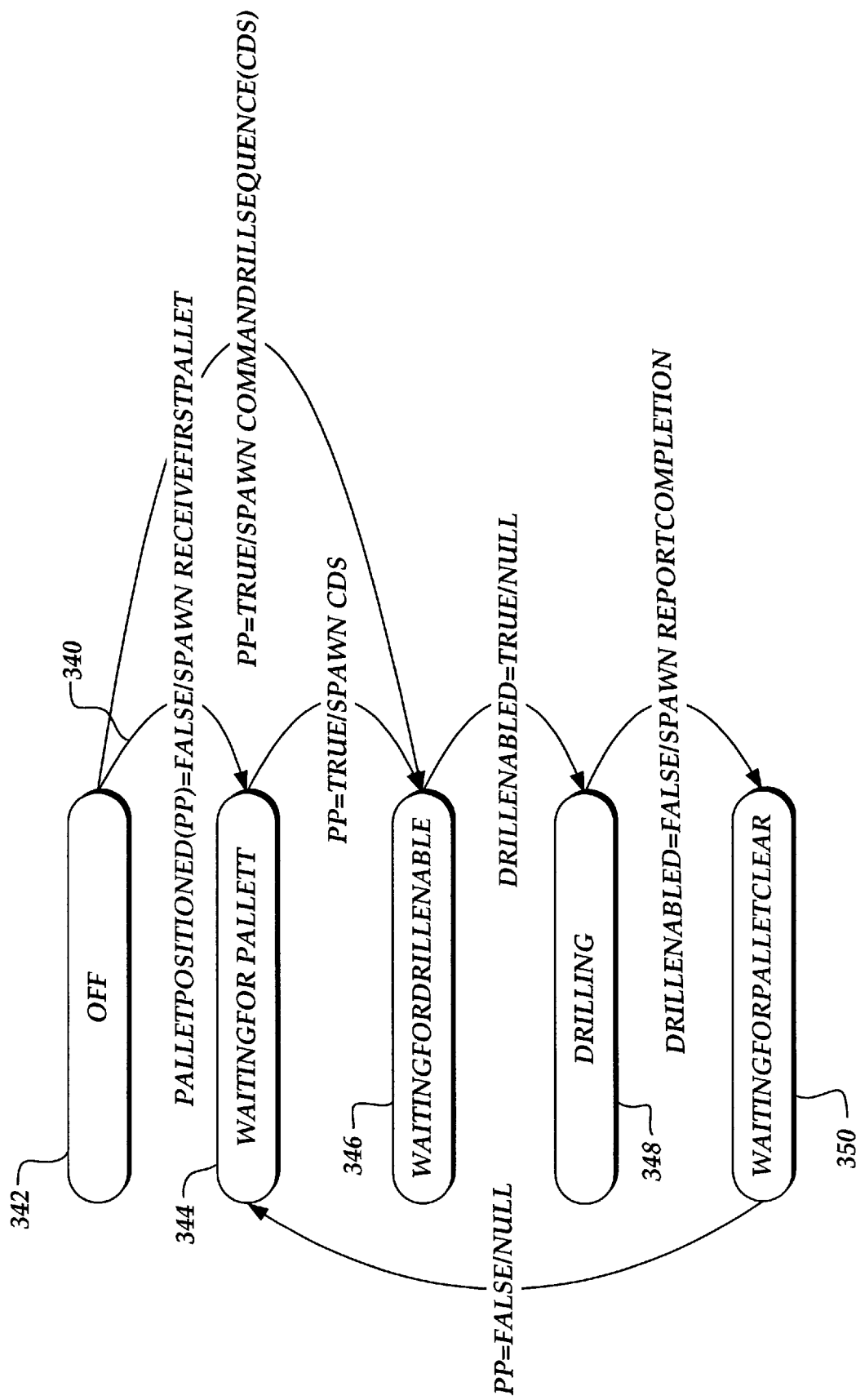
FIGS. 28–34 are state flow diagrams for inputted data shown in FIGS. 16–26.

As noted above, state diagrams for the various classes are illustrated in FIGS. 28–34. Each of the states of the related class is displayed as an oval. The lines with arrows that interconnect the oval states indicate transitions from one state to the other in the direction of the arrows. The data condition and action defined in the define transition section of the related class interface (FIGS. 15 and 16–26) is displayed at the midpoint of each transition line. For example, as shown in FIG. 28, the transition line 340 between the Off state 342 and the WaitingForPalette state 344 of the Drill Work Cell class corresponds to the data condition and corresponding action entered in define transition section 282 for the first defined transition from the Off state 342. Transition line 340 illustrates a transition from the DrillWorkCell object Off state 342 to the WaitingForPalette state 344. This transition occurs if the PalettePositioned data is false, i.e., Palette Positioned data indicates that the palette is not in position for drilling when the DrillWorkCell object is first turned on. The action performed in this first transition is a spawn of transition method ReceiveFirstPalette at priority 4, indicated by the words spawn.P4 in the define transition section 282a of the Drill Work Cell class window (FIG. 15). In this regard, any number of priority levels may be made available—ten, for example. Preferably, level 1 is the highest priority level available. Setting a priority level for an action determines the actions relative importance to other actions being performed concurrently. For ease of description and in order to avoid undue complexity, all priority levels of the example of the application of the invention being described are set at four, meaning that no action is more important than another.

Turning now to a more detailed description of the Drill Work Cell state diagram shown in FIG. 28, when production system 200 is started, the DrillWorkCell class is instantiated by a user input thus becoming DrillWorkCell object. The DrillWorkCell object first enters the Off state 342. As soon as a Palette Positioned data value is determined, the DrillWorkCell object's state immediately transitions. If the PalettePositioned (PP) data value is false, the DrillWorkCell object transitions to the WaitingForPalette state 344. This transition spawns a transition method denoted ReceiveFirstPalette. Conversely, if the PalettePositioned data value is true, the DrillWorkCell object transitions to the WaitingForDrillEnable state 346. This transition spawns a transition method denoted CommandDrillSequence (CDS). If the DrillWorkCell object transitions to the WaitingForPalette state 344, the DrillWorkCell object remains in this state until the PalettePositioned data value becomes true. When this occurs, the DrillWorkCell object transitions to the WaitingForDrillEnable state 346. When this transition occurs, the CommandDrillSequence transition method is spawned.

The DrillWorkCell object remains in the WaitingForDrillEnable state 346, until a transition to Drilling state 348 occurs. A transition to Drilling state 348 occurs when the DrillEnable data value becomes true. No action transition method is spawned when the transition from the WaitingForDrillEnable state 346 to the Drilling state 348 occurs from the Drilling state 348, as indicated by the null notation.

The DrillWorkCell object transitions, to the WaitingForPaletteClear state 350, when the DrillEnable data value becomes false. This occurs when the drilling process is complete. When the transition from Drilling to WaitingForPaletteClear occurs, a ReportCompletion transition method is spawned. The DrillWorkCell object transitions from the WaitingForPaletteClear state 350 to the WaitingForPalette state 344, when PalettePositioned data value is false. When this transition occurs, nothing occurs as signified by the Null. The DrillWorkCell object state information is used to control the generation of the code needed to control the overall functionality of the production system 200. Essentially, the system, as it relates to the DrillWorkCell object, waits for a palette to be positioned. After the palette is positioned, the DrillWorkCell object waits for completion of the drilling process. Next, the DrillWorkCell object waits for the palette to be removed; and, then, waits for the next palette.

A user is able to display the state diagram shown in FIG. 28 by activating the display state diagram button 288 in the button bar of the DrillWorkCell class window 258a (FIG. 16) prior to actuating the generate code button 286a. After the user has reviewed the state diagram and all other information entered into the window, the user is ready to cause the code for the DrillWorkCell class to be generated. To generate the code, the user simply activates the generate code button 286a located in the button bar of the graphical interface tool window 258c. In the DrillWorkCell example of FIG. 16, the class library for DrillWorkCell with the included PalettePositioned and DrillEnabled data is generated. DrillWorkCell code is generated according to the information entered in the object control section of 278. An empty shell coat is created for inputting the specific code for the transition method names assigned to the DrillWorkCell class. No shell coat is created for user methods because no user method names were entered into the define user method section 274a of the DrillWorkCell class window.

Preferably, the drilling system of FIG. 14 is connected via the system controller 202 to an object oriented messaging system common object request broker architecture (CORBA). In order for the drilling system of FIG. 14 to take advantage of fully distributed object-oriented architecture, in such a system, the code generated by the invention must include interface code that allows the invention to communicate in a CORBA environment. More specifically, the generated interface code must include a remote procedure called (RPC) interface file, an interface definition language (IDL) interface file, an RPC server code file, a CORBA server code file, Ada bindings for RPC files and a make file. Further, the RPC interface file must be precompiled by an RPC precompiler to generate a set of RPC files and the IDL interface file must be precompiled by an IDL precompiler to produce a set of CORBA files. RPC, CORBA, IDL and make files and Ada bindings are commonly known files for executing client/server distributive object communication in a CORBA or RPC environment. The final files created are application program interface (API) code files. The API code files provide a level of abstraction between the generated files (CORBA or RPC) and the created class information with any associated class control. The API code files allow state-based control to be directly associated with the an object.

Figure 29:
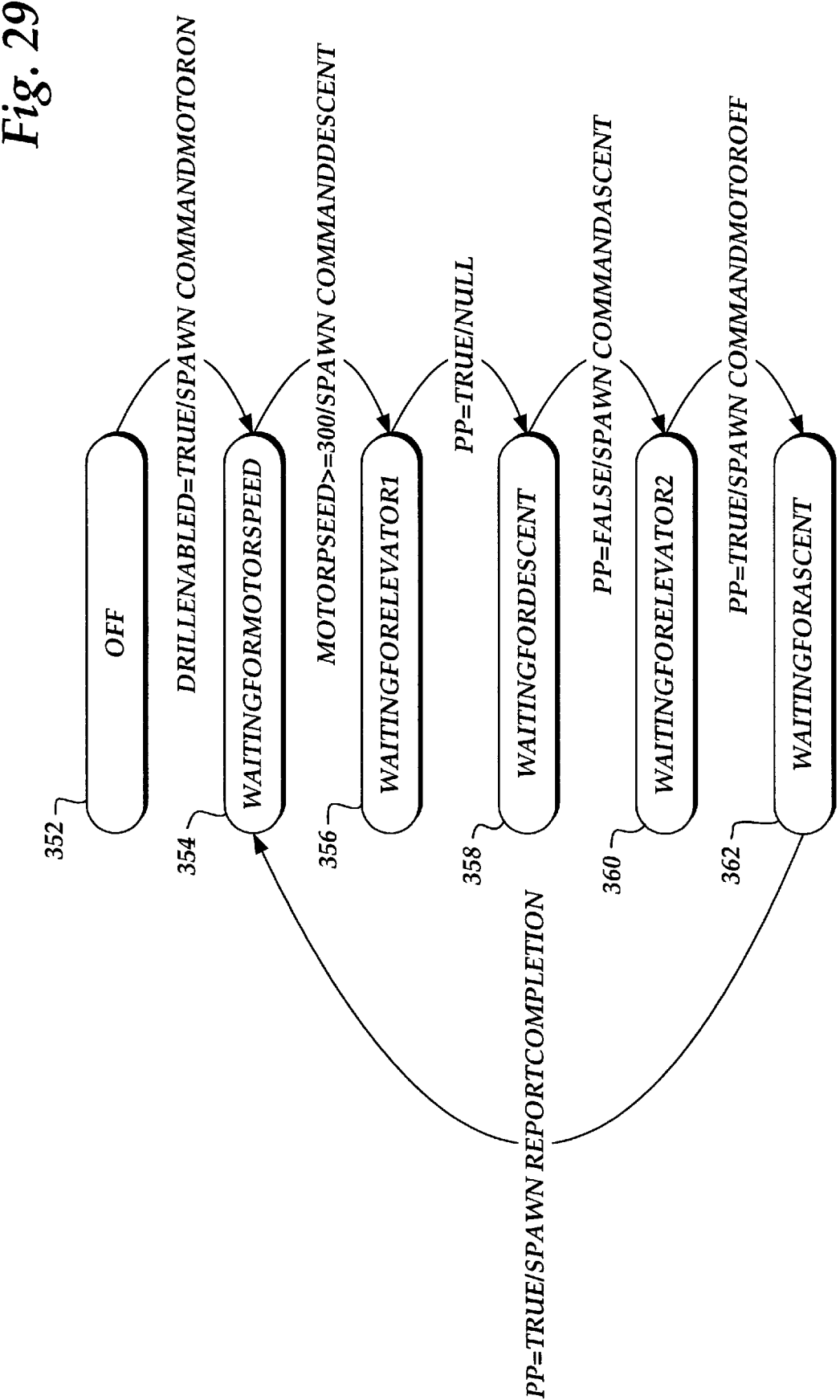

As shown in FIG. 29, the Drill class state diagram includes all the information entered in the object control section 278b of the Drill class window (FIG. 21). As shown in FIG. 29, when the Drill class is instantiated the Drill object immediately enters an Off state 352. The Drill object remains in the off state until DrillEnabled data value is true. When this occurs, the Drill transitions from the Off state to a WaitingForMotorSpeed state 354. When this occurs, a CommandMotorOn transition method is spawned. When the MotorSpeed data indicates that the speed of the drill motor is equal to or is greater than some predefined value, such as 300 RPM, the Drill object transitions from the WaitingForMotorSpeed state 354 to a WaitingForElevator1 state 356. CommandDescent transition method is spawned. When the PalettePositioned data value becomes true, the Drill object transitions from the WaitingForElevator1 state 356 to a WaitingForDescent state 358.

When the PalettePositioned data value becomes false, the Drill object transitions the WaitingForDescent state 358 to a WaitingForElevator2 state 360. When this transition occurs, a CommandAssent transition method is spawned. When the PalettePositioned data value shifts back to true, the Drill object transitions from the WaitingForElevator2 state 360 to a WaitingForAscent state 362. When this transition occurs, a CommandMotorOff transition method is spawned. Since the PalettePositioned data value is true, immediately thereafter the Drill object transitions from the WaitingForAscent state 362 to the WaitingForMotorSpeed state 354. When this transition occurs, a ReportCompletion transition method is spawned. Essentially, the process illustrated in the Drill state diagram shown in FIG. 28 describes the performance of the drill 218. The drill 218 begins with its motor in an off state. The drill motor is turned on when commanded. Then the system waits for the speed of the motor to reach a predefined limit. After the limit is reached and the palette is properly positioned, the drill descends with the elevator 222. Next, the drill rises with the elevator 222, the drill motor is turned off, completion of the task is reported and the sequence of operations is repeated.

Figure 30:
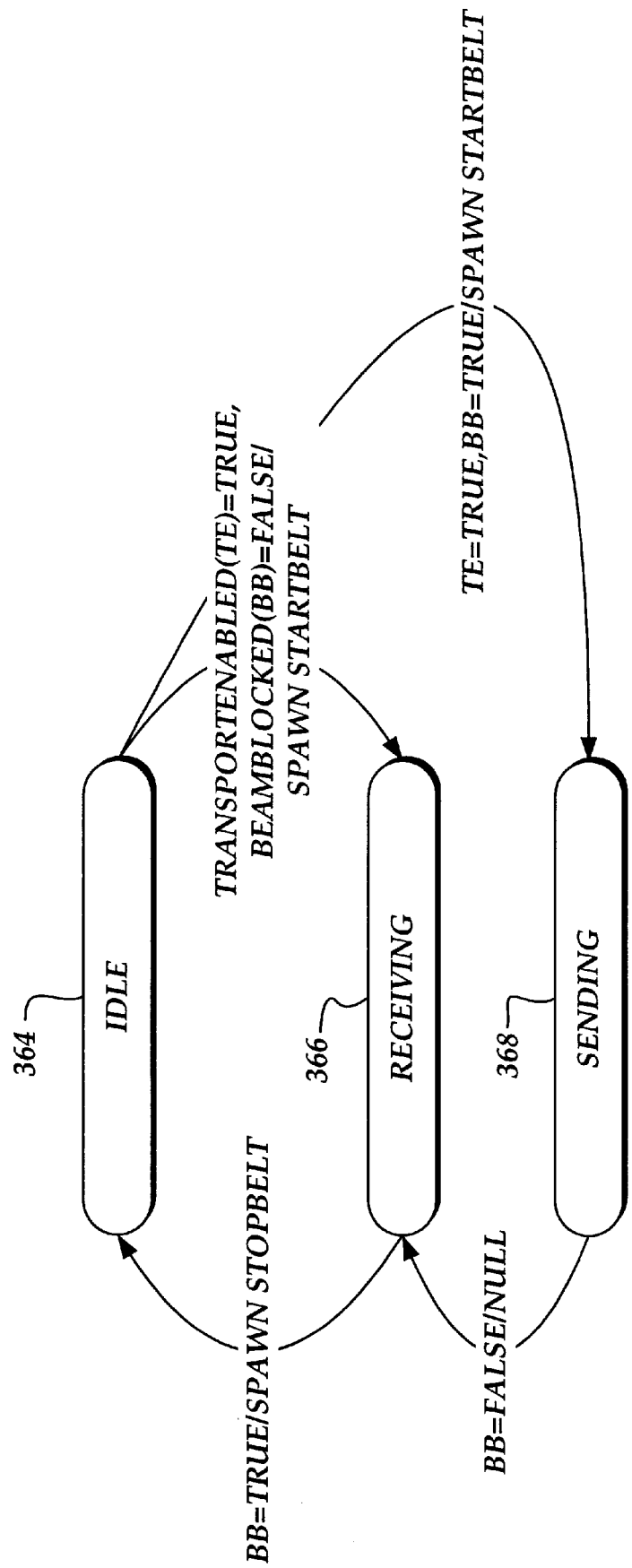

FIG. 30 is a state diagram for the Transport object. When instantiated, the Transport object begins in an Idle state 364. If the TransportEnabled data value is true and the sensor BeamBlocked data value is false, the Transport object transitions from the Idle state to a Receiving state 366. When this transition occurs, a StartBelt transition method is spawned. If the TransportEnabled and SensorBeamBlocked data values are both true, the Transport object transitions from the Idle state to a Sending state 368. When this transition occurs, a StartBelt transition method is also spawned.

If the SensorBeamBlocked data value becomes true when the Transport object is in the Receiving state 366, the Transport object transitions back to the Idle state 364. When this transition occurs, a StopBelt transition method is spawned. If the Sensor's BeamBlocked data value becomes false when the Transport object is in the Sending state, the Transport object transitions to the Receiving state 366. No transition methods are spawned when this transition occurs, as denoted by the null indication. Essentially the following occurs, when enabled, the transport object checks to see if the sensor beam is or is not blocked. If the sensor beam is blocked, indicating that no palette is in position for drilling, the transport motor is started to move a palette into position. The transport motor is stopped when a palette is in position for drilling. If the sensor beam is not blocked when the transport object is enabled, indicating that a palette is in position for drilling, the transport motor is started to move the palette away from the drilling position.

Figure 31:
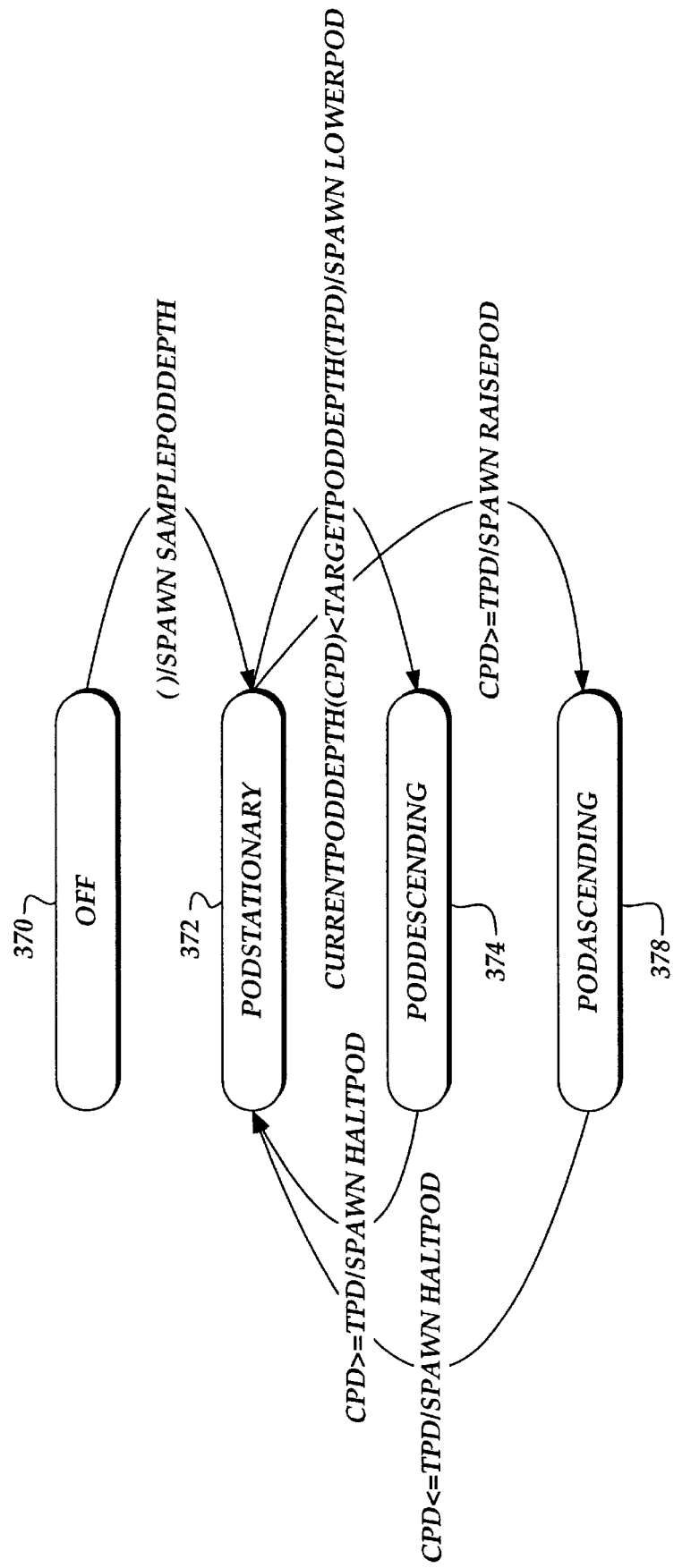

FIG. 31 is a state diagram for the Elevator class (FIG. 23). When the Elevator class is instantiated the Elevator object is placed in an Off state 370, the Elevator object immediately transitions from the Off state 370 to a PodStationary state 372. When the transition from the Off state 370 to PodStationary state 372 occurs, a SamplePodDepth transition method is spawned. If the CurrentPodDepth data value is less than the TargetPodDepth data value, the Elevator object transitions from the PodStationary state 372 to a PodDescending state 374. When this transition occurs, a LowerPod transition method is spawned. If however the CurrentPodDepth data value is greater than or equal to the TargetPodDepth data value, the Elevator object transitions from the PodStationary state 372 to a PodAscending state 378. When this transition occurs, a RaisePod transition method is spawned.

When the Elevator object is in the PodDescending state 374 and the CurrentPodDepth data value becomes greater than or equal to the TargetPodDepth data, the Elevator object transitions to the PodStationary state 372. When this transition occurs, a HaltPod transition method is spawned. When the Elevator object is in the PodAscending state 378 and the CurrentPodDepth data becomes less than the TargetPodDepth data, the Elevator object transitions to the PodStationary state 372. Again, when this transition occurs, a HaltPod transition method is spawned. Essentially the Elevator state diagram (FIG. 31) depicts the operation of the elevator 222 (FIG. 14). The present elevation of the elevator 222 is determined. If the position is higher than the target position of the elevator, the elevator 222 is lowered. If the present position is equal to the target position of the elevator, the elevator 222 is raised. The elevator becomes stationary when the elevator height is lower than or equal to the target height.

Figure 32:
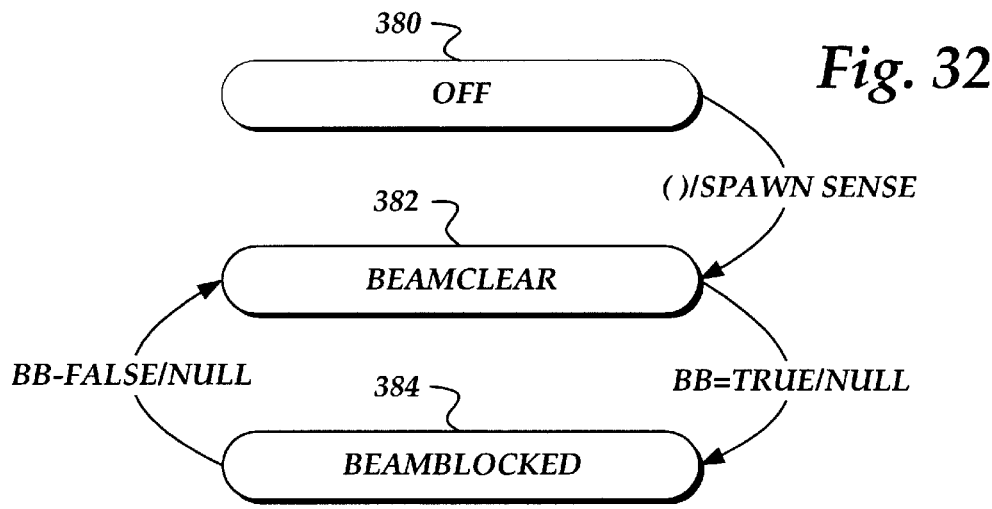

FIG. 32 is a state diagram for the Sensor class (FIG. 24). Upon instantiation of the Sensor class, the Sensor object enters an Off state 380. The Sensor object immediately transitions from the Off state 380 to a BeamClear state 382. When this transition occurs, a Sense transition method is spawned. When the Sensor object is in the BeamClear state 382 and the BeamBlocked data value becomes true, the Sensor object transitions to a BeamBlocked state 384. No transition method is spawned when this transition occurs, as indicated by the null notation in FIG. 32. When the BeamBlocked data value becomes false, the Sensor object transitions from the BeamBlocked state 384 to the BeamClear state 382. Again, no transition method is spawned when this transition occurs, as indicated by the null notation. Essentially, the sensor object (FIG. 14) determines if a palette is in the drilling position based on the BeamBlocked data value.

Figure 33:
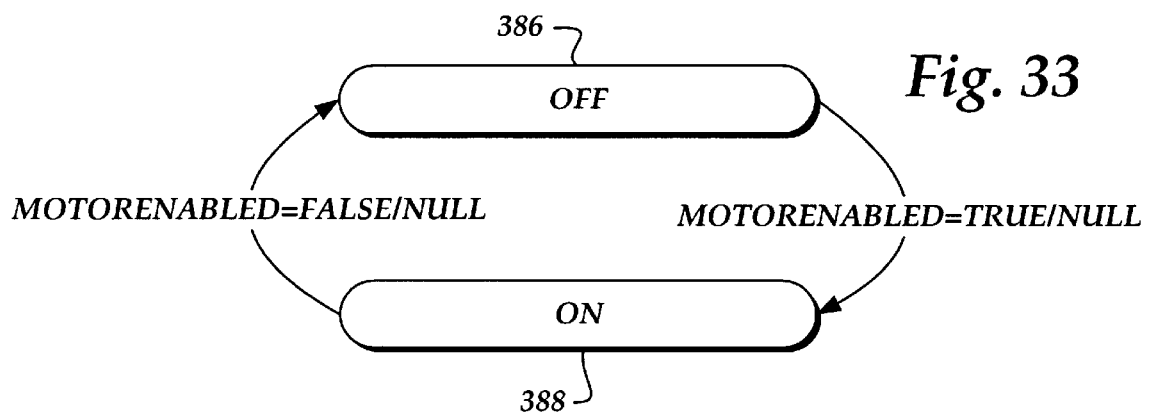

FIG. 33 is a state diagram for the TransportMotor class (FIG. 25). The TransportMotor object has two states—an Off state 386 and an On state 388. The TransportMotor object transitions from the Off state 386 to the On state 388 when the MotorEnabled data value is true. The TransportMotor object transitions from the On state 388 and the Off state 386, when the MotorEnabled data value is false. Neither transition spawns a transition method, as indicated by the null notation in FIG. 32.

Figure 34:
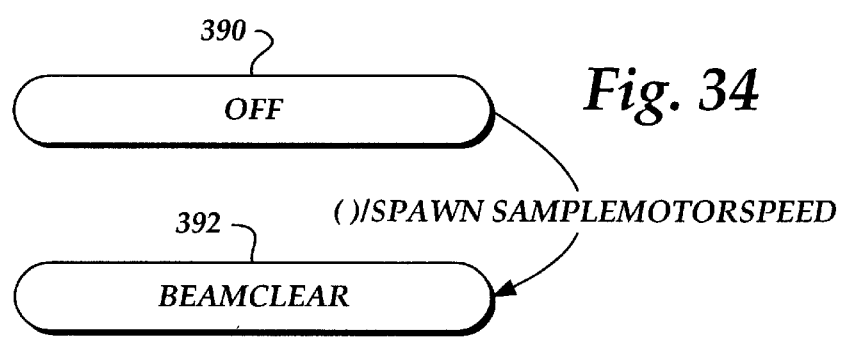

FIG. 34 is a state diagram for the VariableSpeedDrillMotor class (FIG. 26). The VariableSpeedDrillMotor object has two states—an Off state 390 and a BeamClear state 392. Starting in the Off state, the VariableSpeedDrillMotor object immediately transitions to the BeamClear state 392 when instantiated. When this transition occurs, a SampleMotorSpeed transition method is spawned.

The FIGS. 33 and 34 state diagrams depict the functioning of the transport motor 214 and the drill motor 220 (FIG. 14). The transport motor 214 is either on or off depending upon enablement. The VariableSpeedDrillMotor object provides continuous information regarding the speed of the drill motor as evidenced by the SampleMotorSpeed transition method.

While the presently preferred embodiment of the invention has been illustrated and described, it is to be understood that various changes can be made therein without departing from the spirit and scope of the invention as defined by the appended claims.

The embodiments of the invention in which an exclusive property or privilege is claimed are defined as follows:

1. A method for automatically generating application program shell code for a predefined application in an object-oriented system, said system comprising a processor with an operating system running thereon, at least one user interface device, memory and a display device, said method comprising:
   (a) assigning an object name, wherein the object name identifies an object operable in the predefined application;
   (b) assigning at least one data name to the assigned object name according to predetermined requirements for the object;
   (c) assigning a method name to the assigned object name according to predetermined requirements for the object;
   (d) assigning control information to said assigned object name according to said predefined application, wherein said assigning control information includes:
      (i) assigning at least one state name, wherein each state name identifies a distinct state of the object; and
      (ii) assigning an object state transition, if more than one state is assigned; and
   (e) generating application shell code according to the operating system and the assigned names and control information.

2. The method of claim 1, wherein said object state transition assigning comprises assigning a data condition and an action.

3. The method of claim 2, wherein said action comprises assigning a transition method name with at least one of a call function, signal function, or spawn function to the transition method name, or assigning a nullification function according to the predefined application.

4. The method of claim 1, wherein said generated application shell code is operable with other object-oriented systems via an object-oriented messaging system.

5. The method of claim 4, further comprising:
   assigning a machine name to an assigned object name wherein said machine name identifies an object-oriented system connected to the object-oriented messaging system; and
   assigning a server name to the assigned machine name.

6. The method of claim 5, wherein said server name identifies a server on the object-oriented system represented by said assigned machine name.

7. The method of claim 5, wherein said generated application shell code is operable in the assigned server.

8. An object-oriented system for automatically generating application shell code, said system comprising a processor with an operating system running thereon, at least one user interface device, memory and a display device, said system further comprising:
   (a) a graphical interface tool, operating in the operating system and displayed on the display device, for creating object-oriented objects for use in a predefined application, wherein said graphical interface tool comprises:
      (1) a first assigning means for assigning an object name;
      (2) a second assigning means for assigning data names to the assigned object name according to predetermined requirements;
      (3) a third assigning means for assigning method names to the assigned object name according to predetermined requirements; and
      (4) a fourth assigning means for assigning control information to said assigned object name according to said predefined application, wherein said fourth assigning means of the graphical interface tool includes:
         (i) means for assigning at least one state name, wherein each state name represents a distinct state of the object; and
         (ii) a means for assigning an object state transition, if more than one state is assigned; and
   (b) an automatic shell code generating tool, activated through said graphical interface tool and operating in the operating system, for generating application shell code according to the operating system and the assigned names and control information.

9. The system of claim 8, wherein an assigned object state transition comprises a data condition and an action.

10. The system of claim 9, wherein said action comprises at least one of a call function, signal function or spawn function of a transition method, or a nullification function.

11. The system of claim 8, wherein said system is connected to other object-oriented systems via an object-oriented messaging system.

12. The system of claim 11, wherein said graphical interface tool further comprises:
   a fifth assigning means for assigning a machine name to an assigned object name, wherein said machine name represents an object-oriented system connected to the object-oriented messaging system; and
   a sixth assigning means for assigning a server name to the assigned machine name.

13. The system of claim 12, wherein said generated application shell code is operable in the assigned server.

14. The system of claim 12, wherein said assigned server name identifies a server on the object-oriented system represented by said assigned machine name.

15. A computer-readable medium for automatically generating application shell code, said computer-readable medium operable with a processor with an operating system running thereon, at least one user interface device, memory and a display device, said computer-readable medium further comprising:
   (a) a graphical interface tool, operable in the operating system and displayed on the display device, for creating object-oriented objects for use in a predefined application, wherein said graphical interface tool program comprises:
      (1) a first assigning means for assigning an object name;
      (2) a second assigning means for assigning data names to the assigned object name according to predetermined requirements;
      (3) a third assigning means for assigning method names to the assigned object name according to predetermined requirements;
      (4) a fourth assigning means for assigning control information to said assigned object name according to said predefined application, wherein said fourth assigning means of the graphical user interface tool includes:
         (i) means for assigning at least one state name, wherein each state name represents a distinct state of the object; and (ii) means for assigning an object state transition, if more than one state is assigned; and (b) an automatic shell code generating tool, activated through said graphical interface tool and operable in the operating system, for generating application shell code according to the operating system and the assigned names and control information.

16. The computer-readable medium of claim 15, wherein an assigned object state transition comprises a data condition and an action.

17. The computer-readable medium of claim 16, wherein said action comprises at least one of a call function, signal function or spawn function of a transition method, or a nullification function.

18. The computer-readable medium of claim 15, wherein said computer-readable medium located in an object-oriented system is connectable to object-oriented systems via an object-oriented messaging system.

19. The computer-readable medium of claim 18, wherein said graphical interface tool further comprises:

a fifth assigning means for assigning the name of an object-oriented system connected to the object-oriented messaging system; and a sixth assigning means for assigning a server name to the assigned object-oriented system name.

20. The computer-readable medium of claim 19, wherein said server name identifies a server on the object-oriented system represented by said assigned machine name.

21. The computer-readable medium of claim 19, wherein said generated application shell code is operable in the assigned server.

22. An object-oriented system for automatically generating application shell code, said system comprising a processor with an operating system running thereon, at least one user input device and a display device, further comprising:

a graphical interface tool, operating in the operating system, displayed on the display device, for entering object class information for an object-oriented object operating in a predefined application environment, wherein said object class information includes an object class name, data name, method name, action name, at least one state name, and at least one data condition with a resulting transition; and an automatic shell code generating tool operating in the operating system for generating application shell code according to the object class information entered in the graphical interface tool.

23. The system of claim 22, wherein a transition is assigned at least one of the following commands:

a call to an action name;

a signal to an action name;

a spawn to an action name; and a null according to predefined application environment.

24. The system of claim 22, wherein the application shell code generated by the automatic shell code generating tool is compatible with the operating system.

25. The system of claim 22, wherein said system is connected to other object-oriented systems via an object-oriented messaging system.

26. The system of claim 25, wherein said class information for an object class name further includes an object-oriented system name of an object-oriented system connected to the object-oriented messaging system and a server name.

27. The system of claim 26, wherein said server name is assigned to the object-oriented system of the included object-oriented system name.

* * * * *

UNITED STATES PATENT AND TRADEMARK OFFICE
CERTIFICATE OF CORRECTION

PATENT NO. : 5,920,718
DATED : July 6, 1999
INVENTOR(S) : S.A. Uczekaj et al.

It is certified that error appears in the above-identified patent and that said Letters Patent is hereby corrected as shown below:

| COLUMN | LINE | |
|---|---|---|
| [54] 1, col. 1 | Title | After "MACHINE" insert --BEHAVIOR-- |
| [56] 1, col. 1 | Refs. Cited (Other Publs., item 2) | "1884." should read --1994.-- |
| 1 | 4 | After "MACHINE" insert --BEHAVIOR-- |

Signed and Sealed this

Fourth Day of January, 2000

Attest:

Attesting Officer

*Acting Commissioner of Patents and Trademarks*